United States Patent
Groninga et al.

(10) Patent No.: US 12,246,819 B1
(45) Date of Patent: Mar. 11, 2025

(54) THRUST VECTORING PYLON ARRANGEMENT AND METHOD THEREFOR

(71) Applicant: Textron Innovations, Inc., Providence, RI (US)

(72) Inventors: Kirk L. Groninga, Keller, TX (US); Danielle L. Edwards, Grapevine, TX (US)

(73) Assignee: Textron Innovations, Inc., Providence, RI (US)

( * ) Notice: Subject to any disclaimer, the term of this patent is extended or adjusted under 35 U.S.C. 154(b) by 81 days.

(21) Appl. No.: 18/463,001

(22) Filed: Sep. 7, 2023

(51) Int. Cl.
| | |
|---|---|
| *B64C 1/16* | (2006.01) |
| *B64C 15/12* | (2006.01) |
| *B64C 29/00* | (2006.01) |
| *B64C 39/04* | (2006.01) |

(52) U.S. Cl.
CPC .............. *B64C 1/16* (2013.01); *B64C 15/12* (2013.01); *B64C 29/0033* (2013.01); *B64C 39/04* (2013.01)

(58) Field of Classification Search
CPC ........... B64C 5/12; B64C 27/52; B64C 39/04; B64C 1/16; B64U 30/297; B64U 40/10; B64U 50/18
See application file for complete search history.

(56) References Cited

U.S. PATENT DOCUMENTS

| | | | | |
|---|---|---|---|---|
| 3,053,480 A | * | 9/1962 | Vanderlip | B64U 30/297 244/17.13 |
| 3,089,666 A | * | 5/1963 | Quenzler | B64C 29/0033 244/66 |
| 8,931,729 B2 | * | 1/2015 | Abde Qader Alzu'bi | B64U 30/297 244/17.23 |
| 10,589,867 B2 | * | 3/2020 | Lukaczyk | B64U 30/297 |
| 11,485,488 B1 | * | 11/2022 | Armer | B64C 29/0033 |
| 11,511,854 B2 | * | 11/2022 | Baity | B64C 29/0033 |
| 11,608,164 B2 | * | 3/2023 | Choi | B64C 27/52 |
| 11,724,801 B2 | * | 8/2023 | Baity | B64C 29/0033 244/6 |
| 11,926,444 B2 | * | 3/2024 | Munro | B64U 30/14 |

* cited by examiner

*Primary Examiner* — Richard Green
(74) *Attorney, Agent, or Firm* — Whitaker Chalk Swindle & Schwartz PLLC; Enrique Sanchez, Jr.

(57) ABSTRACT

A rotating pylon assembly for aircraft thrust vectoring control. In embodiments, the rotating pylon assembly of embodiments includes a rotating sleeve disposed within a fixed boom of the aircraft, and configured to support a rotor assembly. The rotating pylon assembly includes a bearing assembly configured to functionally couple the rotating sleeve against an inner surface of the fixed boom. The bearing assembly enables the rotating sleeve to rotate against the inner surface of the fixed boom and about a longitudinal axis of the fixed boom. An actuator is configured to rotate the rotating sleeve about the longitudinal axis of the fixed boom. The rotating sleeve may cause the rotor assembly to be rotated or swung about the longitudinal axis of the fixed boom to position the rotor assembly in a position to vector the thrust provided by the rotor assembly based on a control command.

15 Claims, 16 Drawing Sheets

THRUST VECTORING PYLON ARRANGEMENT AND METHOD THEREFOR

TECHNICAL FIELD

The present disclosure generally relates to aircraft control systems, and more specifically to a rotating pylon assembly for aircraft thrust vectoring control.

BACKGROUND

Aircraft designs are a product of intricate engineering, tailored to suit specific mission objectives or operational demands. Over the years, myriad configurations have been conceptualized. These multifaceted designs spring from a need to strike a balance between several attributes, primarily size, endurance, and power. A significant design challenge arises when there is a need for aircraft to possess high endurance but still remain within a compact size. In these cases, endurance may be enhanced by incorporating wings into the aircraft's structure, which may decrease the power consumption of the aircraft, permitting it to remain airborne for extended durations. Yet, the design complexities increase significantly when the aircraft is configured as a vertical take-off and landing (VTOL) aircraft.

VTOL capabilities traditionally demand high power, especially to drive the rotors responsible for the aircraft's vertical ascent and descent. Some implementations may use larger rotors to trim down power consumption, but this approach is not always practical, especially when the VTOL design includes a quadcopters or hexcopter design. In these configurations, rotors are positioned around the aircraft's center of gravity, ensuring balanced flight. However, the use of multiple rotors introduces a new challenge: control. Controlling an aircraft (e.g., controlling the altitude and attitude of the aircraft in hovering flight, including roll, pitch, and yaw) with multiple rotors presents a very complex task, as this may involve controlling the operation of multiple rotors individually and/or collectively.

In some implementation, controlling a multiple-rotor aircraft, especially fixed rotor aircrafts (e.g., multi-rotor aircraft with fixed-pitch rotors), to affect the direction of the aircraft may involve controlling the rotation speed (e.g., revolutions per minute (RPM)) of the different rotors to control the direction of the thrust generated by the rotors to control pitch, roll, and yaw. For example, FIG. 1 shows an example of an aircraft 50 configured with multiple rotors. As shown in FIG. 1, aircraft 50 may include forward rotor assembly 170a, which may be installed on the right-side of aircraft 50 (e.g., to right boom 120a), forward rotor assembly 170b, which may be installed on the left-side of aircraft 50 (e.g., to left boom 120b), rear rotor assembly 160a, which may be installed on the right-side of aircraft 50 (e.g., to right boom 120a), and rear rotor assembly 160b, which may be installed on the left-side of aircraft 50 (e.g., to left boom 120b), as well as fuselage 105, wing 109 and horizontal stabilizer 107. In an example, to effect a roll toward the right side of aircraft 50 (e.g., from the a point of view looking toward the front of the aircraft), the RPM of left-side rotor assemblies 170b and 160b may be increased (e.g., to increase their thrust), while the RPM of right-side rotors 170a and 160a may be maintained or even reduced. In this example, the higher thrust of left-side rotor assemblies 170b and 160b (e.g., with respect to right-side rotor assemblies 170a and 160a) may cause aircraft 50 to roll toward the right side of aircraft 50. Similarly, to pitch the nose of aircraft 50 down, the RPM of forward rotor assemblies 170a and 170b may be decreased (e.g., to decrease their thrust), while the RPM of rear rotors 160a and 160b may be maintained or even increased. In this example, the lower thrust of forward rotor assemblies 170a and 170b (e.g., with respect to rear rotor assemblies 160a and 160b) may cause aircraft 50 to pitch down.

These RPM-based control designs, however, are less than ideal for large aircraft, as the larger mass of larger aircraft affects the authority of the controls that can be obtained from RPM-based controls. Additionally, in these RPM-based aircraft, a translation or yaw maneuver may require a rolling and/or pitch maneuver, as these aircraft are not able to perform a pure yaw or translation move maneuver. Additionally, in these aircraft, the yaw and/or translation rate that can be achieved is very limited as the size of the aircraft grows.

Some designs incorporate collective controls to modulate the pitch angle of rotor blades. While this provides an added layer of control, it also introduces complexities. For example, the design is far more complex, especially in the rotor hub. In addition, including collective controls may increase the diameter of the rotor masts, which may increase not only the weight of the aircraft, but also may increase the drag of the rotors.

In some other designs, control of the thrust vector of the rotors of the aircraft may be obtained using a thrust vectoring arrangement of the rotors in which the rotation plane of the rotors may be change in order to change the thrust vector of the rotors. The thrust vectoring arrangement of the rotors of these implementations may use RPM-controls, but may also allow the rotors to pivot to change the thrust vector of the rotors. However, these designs may only be used in tilting pylon arrangements, as they are designed to pitch the rotors in the tilting pylon assemblies to change or control the thrust vector of the rotors.

In summary, the realm of aircraft design, particularly when balancing size, endurance, and power, remains a challenging frontier. From the introduction of wings to augment endurance, to the multifaceted world of VTOL configurations, engineers and designers are perpetually in pursuit of the optimal blend of features. Each design proposition, be it RPM-controlled multirotor systems or thrust vectoring arrangements, brings with it a unique set of advantages and challenges that current designs may not be able to handle.

SUMMARY

The present disclosure achieves technical advantages as a rotating pylon assembly for aircraft thrust vectoring control. In embodiments, the rotating pylon assembly of embodiments may include a rotating sleeve configured to be disposed within a fixed boom of the aircraft. The rotating sleeve may be configured to support a rotor assembly providing thrust for propelling the aircraft. The rotating pylon assembly of embodiments may include a bearing assembly may be configured to functionally couple the rotating sleeve against an inner surface of the fixed boom of the aircraft. In embodiments, the bearing assembly may enable the rotating sleeve to rotate against the inner surface of the fixed boom and about a longitudinal axis of the fixed boom. An actuator functionally coupled to the rotating sleeve may be configured to provide a force to rotate the rotating sleeve about the longitudinal axis of the fixed boom. In embodiments, rotating sleeve may cause the rotor assembly to be rotated or swung about the longitudinal axis of the fixed boom to position the rotor assembly in a position to vector the thrust provided by the rotor assembly based on a control command.

For example, in some embodiments, an aircraft may include a plurality of rotating pylon assemblies, to each of which a rotor assembly may be installed. Each rotating pylon assembly of the plurality of rotating pylon assemblies may include a rotating sleeve disposed within a fixed boom of the aircraft. In embodiments, a directional command specifying a direction along which the aircraft is to move may be received by a controller. In response to the received directional command, the controller may cause the rotating sleeve of one or more of the rotating pylon assemblies to be rotated (e.g., by the actuator) to position the rotor assembly functionally mounted to the rotated sleeve in a position to vector the thrust generated by each of the rotor assemblies in a direction that may enable the aircraft to move in the direction specified in the directional command.

In embodiments, a direction along which the aircraft is to move may include be specified as an absolute direction, a relative direction, a change in orientation, a change in direction, etc. For example, in some embodiments, the directional command specifying a direction along which the aircraft is to move may specify a change (e.g., a rate of change) in a particular orientation, such as a pitch, roll, and/or yaw change. In these embodiments, the rotating sleeve of one or more of the rotating pylon assemblies may be rotated to position the rotor assemblies in a position to vector the thrust generated by each of the rotor assemblies to effect the change (e.g., yaw, roll, and/or pitch) based on the rate specified in the directional command. In some embodiments, the directional command specifying a direction along which the aircraft is to move may specify a translational change, in which the aircraft is requested to move in a side-to-side translational direction. In these embodiments, the rotating sleeve of one or more of the rotating pylon assemblies may be rotated to position the rotor assemblies in a position to vector the thrust generated by the rotor assemblies to move the aircraft in a side-to-side translational direction in accordance with the directional command without minimal or no rolling of the aircraft. In some embodiments, the directional command specifying a direction along which the aircraft is to move may specify a yaw move, in which the aircraft is requested to execute a yaw move. In these embodiments, the rotating sleeve of one or more of the rotating pylon assemblies may be rotated to position the rotor assemblies in a position to vector the thrust generated by the rotor assemblies to yaw the aircraft in accordance with the directional command without minimal or no rolling of the aircraft.

The present disclosure solves the technological problem of directional control of a rotor-based aircraft. As noted above, typical multi-rotor aircraft utilize an RPM-based control scheme and/or a tilt rotor-based control scheme to control the thrust vector of the multiple rotors. The present disclosure provides a technological solution that is missing from conventional systems by providing a mechanism for thrust vectoring that incorporates a rotating pylon assembly that is disposed within a fixed boom of the aircraft, allowing the rotor assembly to be rotated, swung, or tilted about the longitudinal axis of the fixed boom for thrust vectoring. The rotating pylon assembly of embodiments enables an aircraft directional control to have a higher authority with respect to an RPM-based control system, especially in bad-weather conditions, and may enable the aircraft to perform side-to-side translation or a yaw movement without (or with minimal) rolling, which provides a significant benefit for performing controlled turns or maneuvers. For example, in designs with a wing, landing the aircraft may require making translational or yaw correction, which, if rolling or yaw cannot be perform without rolling, may cause the tip of the wing to hit the ground. Present embodiments mitigate this risk by allowing the aircraft to translation or yaw to correct without rolling.

It is an object of the disclosure to provide a rotating pylon system configured to facilitate control of an aircraft. It is a further object of the disclosure to provide a method of controlling an aircraft. It is a further object of the disclosure to provide a tiltrotor aircraft. These and other objects are provided by the present disclosure, including at least the following embodiments.

In one embodiment, a rotating pylon system configured to facilitate control of an aircraft is provided. The system includes a rotating sleeve configured to be disposed within a fixed boom of the aircraft and configured to support a rotor assembly and a bearing assembly configured to functionally couple the rotating sleeve against an inner surface of the fixed boom. In embodiments, the bearing assembly enables the rotating sleeve to rotate against the inner surface of the fixed boom and about a longitudinal axis of the fixed boom. The system also includes an actuator functionally coupled to the rotating sleeve configured to provide a force to rotate the rotating sleeve about the longitudinal axis of the fixed boom to position the rotor assembly based on a control command to vector a thrust provided by the rotor assembly.

In another embodiment, a method of controlling an aircraft is provided. The method includes receiving a directional command specifying a direction along which the aircraft is to move and rotating at least one rotor assembly of a plurality of rotor assemblies of the aircraft about a longitudinal axis of at least one fixed boom of the aircraft to position the at least one rotor assembly to vector a thrust of the at least one rotor assembly to move the aircraft in the direction specified in the directional command. In embodiments, rotating the at least one rotor assembly includes rotating at least one rotating pylon disposed within the at least one fixed boom of the aircraft. In embodiments, the at least one rotor assembly is functionally coupled to the at least one rotating pylon and configured to rotate about the longitudinal axis of the at least one fixed boom.

In another embodiment, a tiltrotor aircraft is provided. The tiltrotor aircraft includes at least one fixed boom, at least one rotor assembly, and at least one rotating pylon assembly disposed within the at least one fixed boom. In embodiments, each of the at least one rotating assembly includes a rotating sleeve configured to be disposed within the at least one fixed boom and configured to support a respective rotor assembly of the at least one rotor assembly and a bearing assembly configured to functionally couple the rotating sleeve against an inner surface of the at least one fixed boom. In embodiments, the bearing assembly enables the rotating sleeve to rotate against the inner surface of the at least one fixed boom and about a longitudinal axis of the at least one fixed boom. Each of the at least one rotating assembly also includes an actuator functionally coupled to the rotating sleeve configured to provide a force to rotate the rotating sleeve about the longitudinal axis of the at least one fixed boom to position the at least one rotor assembly based on a control command to vector a thrust provided by the at least one rotor assembly.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

Figure 1:
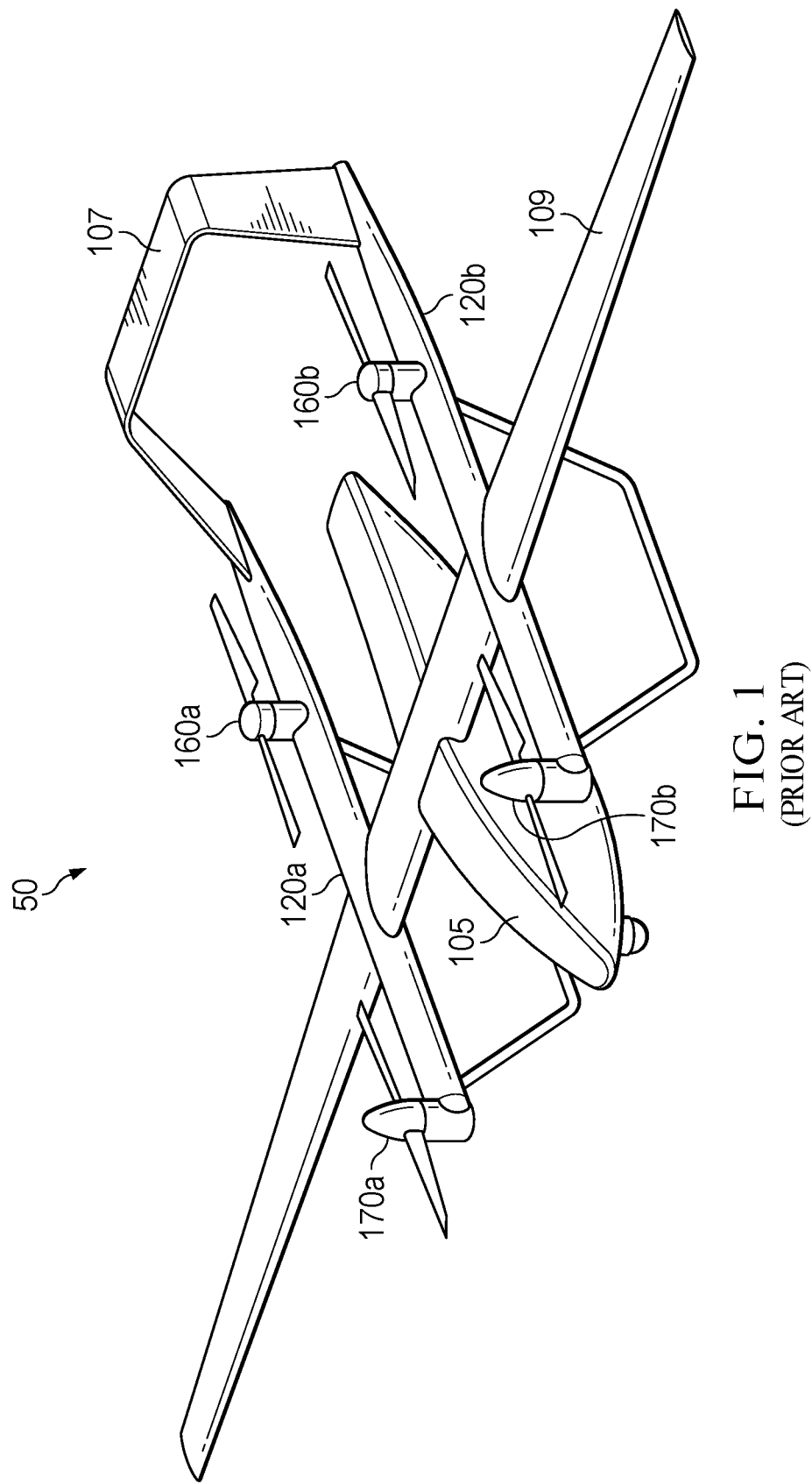
FIG. 1 shows an example of an aircraft configured with multiple rotors.

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented here-in encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to rotating pylon assemblies for aircraft thrust vectoring control. In particular embodiments, the rotating pylon assembly of embodiments may include a rotating sleeve configured to be disposed within a fixed boom of the aircraft. The rotating sleeve may be configured to support a rotor assembly providing thrust for propelling the aircraft. The rotating pylon assembly of embodiments may include a bearing assembly may be configured to functionally couple the rotating sleeve against an inner surface of the fixed boom of the aircraft. In embodiments, the bearing assembly may enable the rotating sleeve to rotate against the inner surface of the fixed boom and about a longitudinal axis of the fixed boom. An actuator functionally coupled to the rotating sleeve may be configured to provide a force to rotate the rotating sleeve about the longitudinal axis of the fixed boom. In embodiments, rotating sleeve may cause the rotor assembly to be rotated or swung about the longitudinal axis of the fixed boom to position the rotor assembly in a position to vector the thrust provided by the rotor assembly based on a control command.

In embodiments, an aircraft may include a plurality of rotating pylon assemblies, to each of which a rotor assembly may be installed. Each rotating pylon assembly of the plurality of rotating pylon assemblies may include a rotating sleeve disposed within a fixed boom of the aircraft. In embodiments, a directional command specifying a direction along which the aircraft is to move may be received by a controller. In response to the received directional command, the controller may cause the rotating sleeve of one or more of the rotating pylon assemblies to be rotated (e.g., by the actuator) to position the rotor assembly functionally mounted to the rotated sleeve in a position to vector the thrust generated by each of the rotor assemblies in a direction that may enable the aircraft to move in the direction specified in the directional command.

Figure 2A:
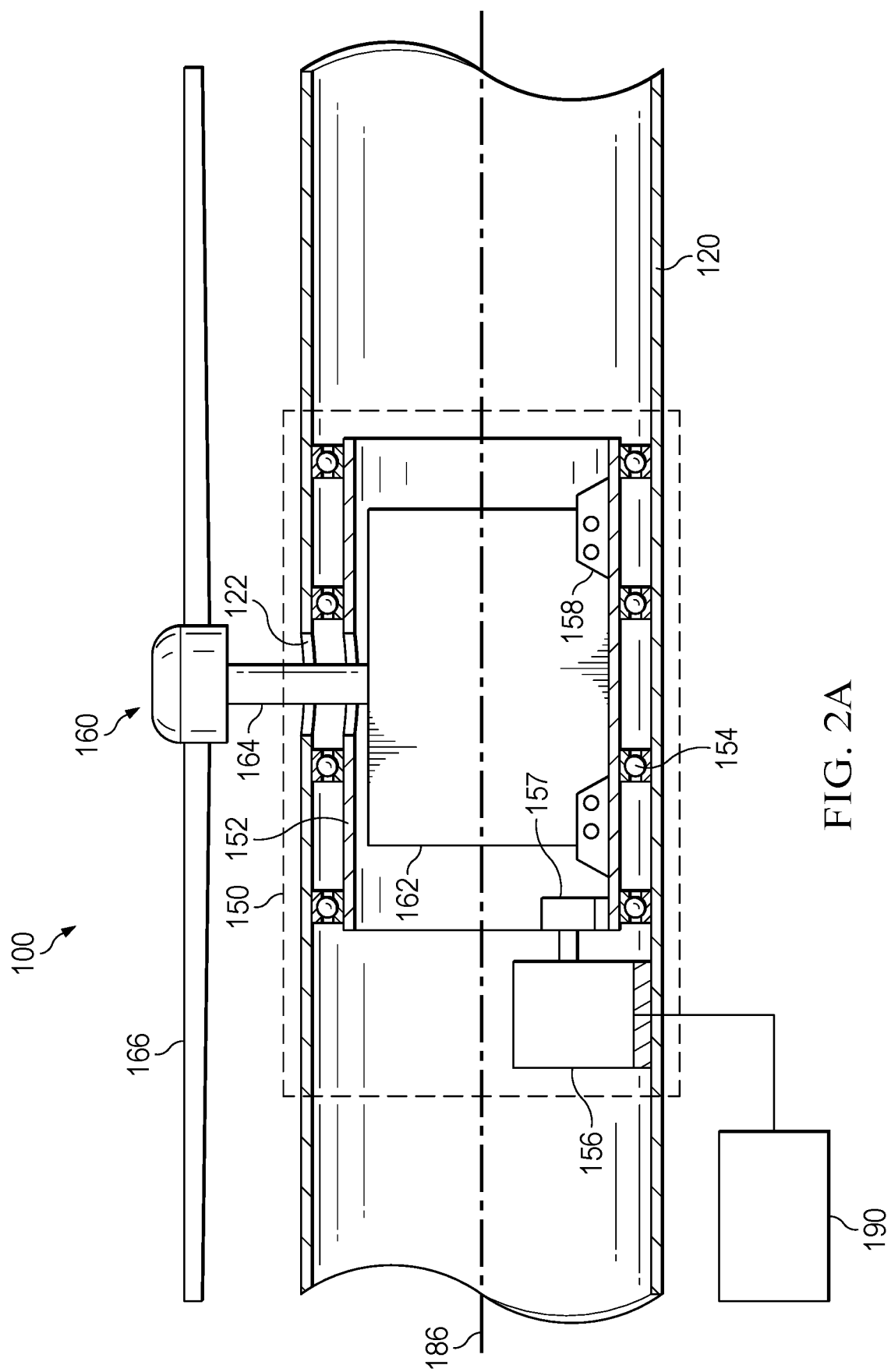
FIG. 2A is a diagram of an exemplary system configured with capabilities and functionality for implementing a rotating pylon assembly for aircraft thrust vectoring control in accordance with embodiments of the present disclosure.

FIG. 2A is a diagram of an exemplary system 100 configured with capabilities and functionality for implementing a rotating pylon assembly for aircraft thrust vectoring control in accordance with embodiments of the present disclosure. As shown in FIG. 2A, system 100 may include rotating pylon assembly 150, rotor assembly 160, fixed boom 120, and controller 190. In embodiments, these components of system 100 may cooperatively operate to provide thrust vectoring control in accordance with embodiments of the present disclosure.

It is noted that the diagram shown in FIG. 2A represents a cross sectional view of system 100 as installed on fixed boom 120 along longitudinal axis 186 of fixed boom 120. In embodiments, fixed boom 120 may be a fixed boom of an aircraft (e.g., aircraft 50 of FIG. 1) and may define a chamber within fixed boom 120. In some embodiments, fixed boom 120 may be one of a plurality of fixed booms of the aircraft. For example, as shown in FIG. 1, aircraft 50 may include right-side fixed boom 120a and left-side fixed boom 120b. In these cases, system 100 may be configured to be installed within right-side fixed boom 120a and/or left-side fixed boom 120b.

Figure 2B:
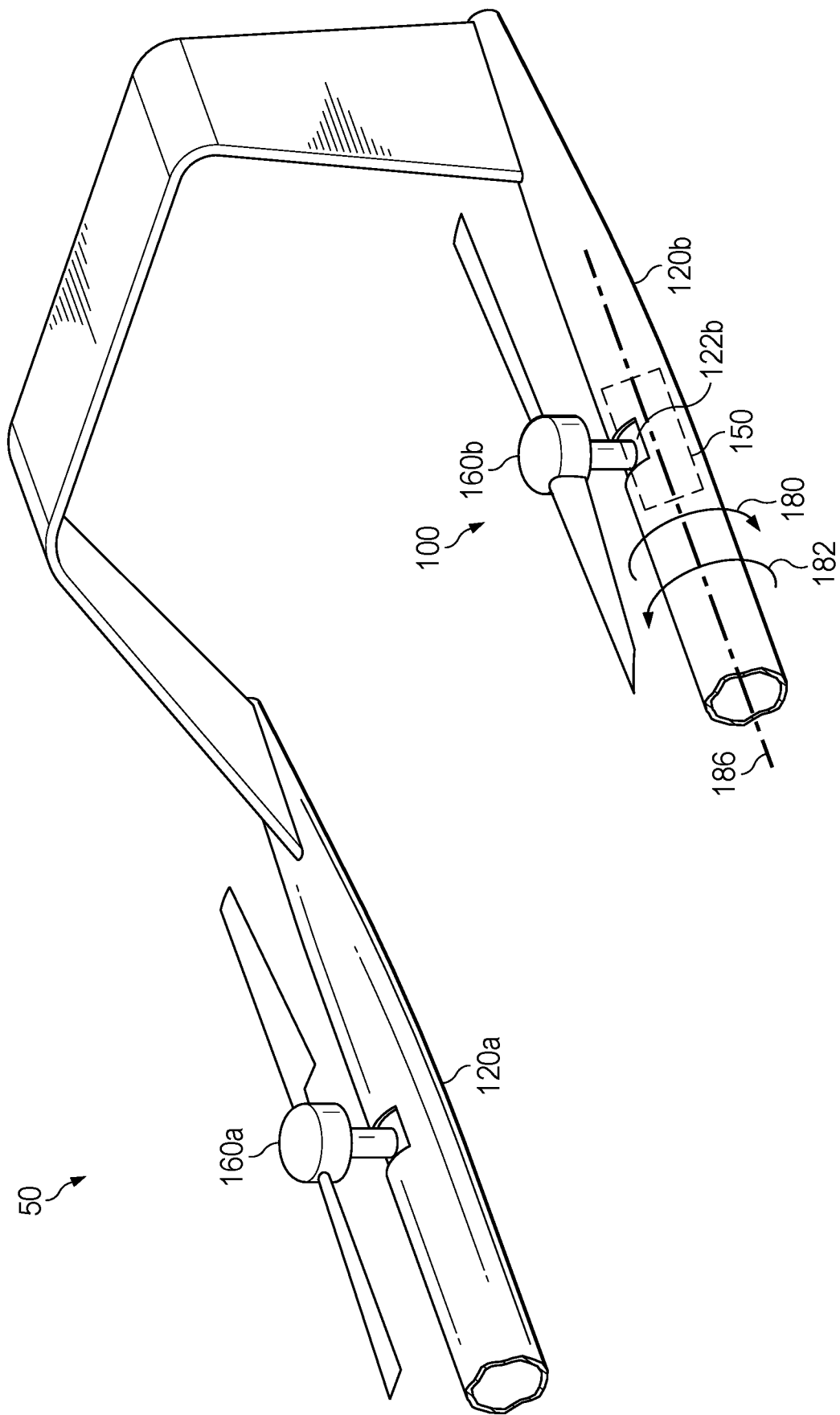
FIG. 2B is a perspective view of the exemplary system installed in a fixed boom configured with capabilities and functionality for implementing a rotating pylon assembly for aircraft thrust vectoring control in accordance with embodiments of the present disclosure.

For example, FIG. 2B is a perspective view of exemplary system 100 installed in fixed boom 120b configured with capabilities and functionality for implementing a rotating pylon assembly for aircraft thrust vectoring control in accordance with embodiments of the present disclosure. As shown in FIG. 2B, system 100 may be installed in fixed boom 120b. In particular, rotating pylon assembly 150 may be installed within (in some embodiments entirely) fixed boom 120b.

With reference back to FIG. 2A, rotating pylon assembly 150 may include rotating sleeve 152, one or more bearings 154, and actuator 156. Rotating sleeve 152 may be configured to be disposed (in some embodiments entirely) within the chamber defined by the interior of fixed boom 120. In embodiments, rotating sleeve 152 may have a cylindrical shape that may be configured to follow the contour of the interior chamber of fixed boom 120. For example, where fixed boom 120 has a cylindrical shape, rotating sleeve 152 may have a cylindrical shape such that rotating sleeve 152 disposed inside of fixed boom 120 may represent a cylinder within a cylinder. In this manner, rotating sleeve 152 may be configured to rotate against the inner surface of fixed boom 120. In some embodiments, rotating sleeve 152 may not have an entirely cylindrical shape but may have at least a portion of its surface that is cylindrical to allow rotating sleeve to rotate at least partially about the longitudinal axis of fixed boom 120. In this case, rotating sleeve 152 may be enabled to rotate enough to position rotor assembly 160 in position within a range of angular degrees of rotation.

In embodiments, a bearing assembly, which may include one or more bearings 154, may be configured to functionally couple rotating sleeve 152 to fixed boom 120. For example, one or more bearings 154 may be disposed (e.g., at various locations) between rotating sleeve 152 and the interior surface of fixed boom 120 to allow rotating sleeve 152 to rotate against the surface of fixed boom 120. In this manner, rotating sleeve 152 may rotate about longitudinal axis 186 of fixed boom 120 while fixed boom 120 does not rotate. In embodiments, the placement of one or more bearings 154 may be based on operating requirements and may include a plurality of bearings. In embodiments, one or more bearings 154 may be fixedly coupled to fixed boom 120 while rotating sleeve 152 may rest upon one or more bearings 154 (e.g., without rotating sleeve 152 being fixedly coupled to one or more bearings 154) allowing rotating sleeve 152 to rotate against fixed boom 120. In other embodiments, one or more bearings 154 may be fixedly coupled to rotating sleeve 152 while resting upon fixed boom 120 (e.g., without one or more bearings 154 being fixedly coupled to fixed boom 120) allowing rotating sleeve 152 to rotate against fixed boom 120. In some embodiments, one or more bearings 154 may be coupled to a bearing mount (not shown) of rotating sleeve 152 such that the bearing mount is fixedly coupled to rotating sleeve 152 but rotatingly coupled to one or more bearings 154 (e.g., may rotate with respect to one or more bearings 154).

In still other embodiments, one or more bearings 154 may be fixedly coupled to fixed boom 120 and may be coupled to a circular shaft (not shown) that may be configured to mount to rotating sleeve 152 such that the circular shaft is allowed to slide through the one or more bearings 154. By allowing the circular shaft to slide through the one or more bearings 154, rotating sleeve 152 may be allowed to rotate with respect to fixed boom 120.

Mounting assembly 158 may be configured to enable fixedly attaching rotor assembly 160 to rotating sleeve 152. In this manner, mounting assembly 158 may allow rotor assembly 160 to be secured against rotating sleeve 152 of rotating pylon assembly 150. In some embodiments, mounting assembly 158 may include fasteners, bolts, screws, etc. to secure rotor assembly 160 against rotating sleeve 152. In embodiments, mounting assembly 158 may secure motor 162 to rotating sleeve 152. By securing rotor assembly 160 against rotating sleeve 152, system 100 may ensure that rotor assembly is rotated about longitudinal axis 186 when rotating sleeve 152 is rotated about longitudinal axis 186 of fixed boom 120.

Rotor assembly 160 may include motor 162, rotor mast 164, and one or more rotor blades 166. In embodiments, motor 162 may include an electric motor, an internal combustion engine, a hybrid motor, etc. configured to provide a power to rotate rotor mast 160 which may cause one or more rotor blades 166 to rotate generating a thrust for rotor assembly 160 which can be used to move the aircraft (e.g., according to directional commands). In embodiments, as rotor mast 164 and one or more rotor blades 166 rotate with respect to motor 162, motor 162 is fixed within the rotating frame of reference, which in embodiments may be accomplished by securely fixing motor 162 to rotating sleeve 152 (e.g., via mounting assembly 158).

As seen in FIG. 2A, rotating sleeve 152 and motor 162 may be disposed within or inside (e.g., in some embodiments entirely) fixed boom 120. In this configuration, rotor mast 164 may be attached at one end to motor 162 while attached to the one or more rotor blades 166 at the other end. As one or more rotor blades 166 operate outside of fixed boom 120, rotor mast 164 may protrude from inside of fixed boom 120 (e.g., from the chamber defined by the interior of fixed boom 120) to the outside of fixed boom through rotation slot 122. In this manner, motor 162 may be securely attached to rotating sleeve 152 inside of fixed boom 120 while being able to provide power to drive one or more rotor blades 166.

In embodiments, rotation slot 122 may be configured to allow rotor assembly 160 to rotate, swing, or tilt about longitudinal axis 186 of fixed boom 120 within a range of angular degrees. In particular, rotation slot 122 may allow rotor mast 164 to move within rotation slot 122 within the range of angular degrees. For example, as shown in FIG. 2B, rotation slot 122b may represent a slot, opening or aperture on fixed boom 120b allowing the rotor mast of rotor assembly 160*b* to protrude through fixed boom 120*b* from the interior of fixed boom 120*b* to the exterior of fixed boom 120*b*.

In embodiments, rotation slot 122*b* may be shaped such to allow rotor mast 122*b* to pass through and to allow (and/or limit) movement of the rotor mast of rotor assembly 160*b* within rotation slot 122*b* between a first point and second point, where the first point and second point define a range of angular degrees. For example, rotation slot 122*b* may allow the rotor mast of rotor assembly 160*b* to move in the left direction 180 and/or in the right direction 182 to rotate, swing or tilt rotor assembly 160*b* in the respective direction.

Figure 2C:
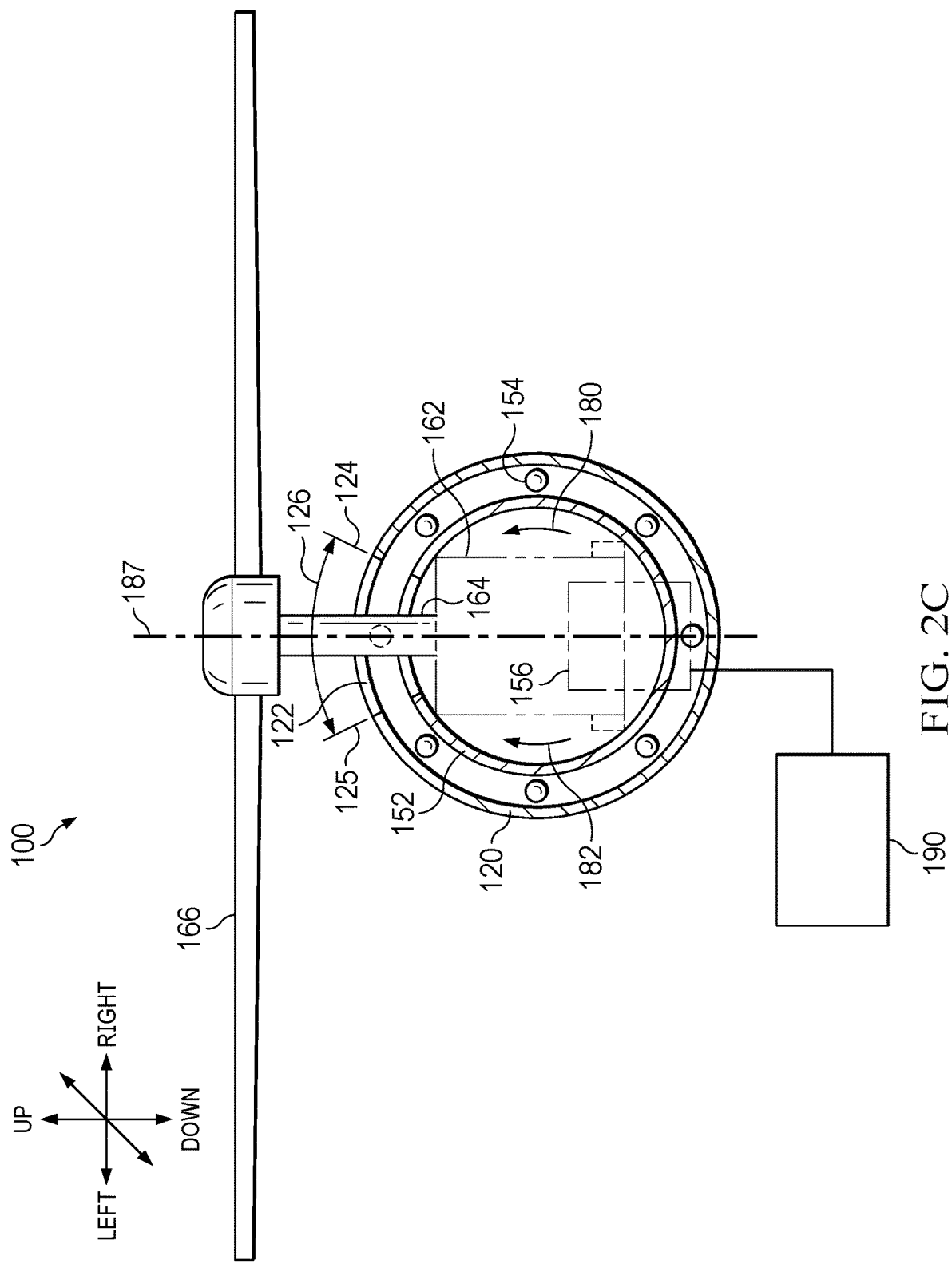
FIG. 2C is a diagram of an exemplary system configured with capabilities and functionality for implementing a rotating pylon assembly for aircraft thrust vectoring control in accordance with embodiments of the present disclosure.

For example, FIG. 2C is a diagram of an exemplary system 100 configured with capabilities and functionality for implementing a rotating pylon assembly for aircraft thrust vectoring control in accordance with embodiments of the present disclosure. FIG. 2C represents a cross sectional view of system 100 as installed on fixed boom 120 across the longitudinal axis of fixed boom 120. As shown, rotation slot 122 may represent an opening on the surface (or wall) of fixed boom 120 allowing rotor mast 164 to pass therethrough. Rotation slot 122 may be an opening from first point 124 to second point 125, which may allow rotor mast 164 to rotate, swing, or tilt through range 126, which extends from first point 124 to second point 125. For example, rotor mast 164 may be allowed to rotate in the left direction 180 toward second end 125. In embodiments, rotor mast 164 may be prevented from rotating in the left direction 180 beyond second end 125. Rotor mast 164 may be allowed to rotate in the right direction 182 toward first end 124. In embodiments, rotor mast 164 may be prevented from rotating in the right direction 182 beyond first end 124.

Range 126 may represent a range of angular degrees of rotation with respect to perpendicular axis 187, which is an axis running from the top to the bottom of fixed boom 120. In embodiments, the range of angular degrees of range 126 may range from approximately 45 degrees from perpendicular axis 187 to first end 124 to approximately 45 degrees from perpendicular axis 187 to second end 125 (e.g., defining a total range 126 of 90 degrees between first end 124 and second end 125 through or within which rotor mast 164 is allowed to move, rotate, swing, or tilt in accordance with embodiments herein).

In embodiments, rotation slot 122 may have an oval shape that is overlaid on surface of fixed boom 120. In embodiments, the size of rotation slot 122 (e.g., the diameter of rotation slot 122) may be based on the diameter of rotor mast 164 and may be configured to accommodate rotor mast 164 while preventing an increase in the drag coefficient of the aircraft. For example, the size of rotation slot 122 may not be exceedingly large with respect to the diameter of the rotor mast. In some embodiments, range 126 may be decreased to limit the size of rotation slot 122. In some embodiments, a seal (not shown) may be used to cover the portions of rotation slot 122 not currently used by rotor mast 164 (e.g., the portions of rotation slot 122 where rotor mast 164 is not) to prevent dirt and/or other contaminants from entering the system and/or to reduce the drag.

With reference back to FIG. 2A, actuator 156 may be configured to provide a force to rotate, swing, and/or tilt rotating sleeve 152 about longitudinal axis 186 of fixed boom 122 to position rotor assembly 160 in a position based on a control command to vector the thrust provided by rotor assembly 160 in accordance with the control command. In embodiments, actuator 156 may include a rotational actuator functionally coupled to rotating sleeve 152 (e.g., via rotational mount 157, which may include a cog coupled to rotating sleeve 152) to rotation rotating sleeve 152 about longitudinal axis 186. In some embodiments, actuator 156 may include a linear actuator functionally coupled to rotating sleeve 152 (e.g., via rotational mount 157). In these embodiments, rotational mount 157 may include a cam configured to convert the linear motion of actuator 156 to a rotational motion causing rotating sleeve 152 to rotate about longitudinal axis 186.

In embodiments, the size of actuator 156 may be based on the inertia created by the rotation of one or more rotor blades 166. An actuator with a higher torque may be used for applications with a higher inertia than for applications with a lower inertial generated by the rotating disc (e.g., the rotation of one or more rotor blades 166). In embodiments, the size (e.g., the torque rating) of actuator 156 may be proportional to the size and/or the gyroscopic moment of rotor assembly 160.

In embodiments, controller 190 may be configured to generate signals for causing actuator 156 to activate rotation of rotating sleeve 152 to position rotor assembly 160 in a position to vector the thrust of rotor assembly in a particular direction based on a directional command. For example, a directional command may be received by controller 190 or another component of the aircraft. The directional command may specify a direction along which the aircraft is to move. For example, the directional command may specify that the aircraft is to perform a side-to-side translational move and/or a yaw move. In some embodiments, the directional command may also specify the rate of the move, such as the translation rate or the yaw rate. In embodiments, controller 190 may determine, based on the directional command, an angular rotation (e.g., angle and direction) to rotate, swing, or tilt rotating sleeve 152 to position rotor assembly 160 in an angular position to vector the thrust of rotor assembly 160 to execute the directional command.

For example, with reference to FIG. 2C, controller 190 may determine, based on the issued or received directional command, that rotor assembly is to be rotated, swung, or tilted in left direction 180 to an angle of 15 degrees with respect to perpendicular axis 187. In this case, controller 190 may generate a signal to activate actuator 156 to rotate rotating sleeve 152 in the left direction 180 until 15 degrees from perpendicular axis 187 is reached. This angular rotation may position rotor assembly 160 to vector the thrust generated by assembly 160 in the angular direction. This exemplary angular rotation (e.g., of 15 degrees in the left direction) may be determined to execute (or facilitate execution of) the directional command. In some embodiments, as described in more detail below, each of a plurality of rotating pylons may be rotated, swung, or tilted to execute (or facilitate execution of) the directional command, in combination with rotating pylon assembly 150.

In another example, controller 190 may determine, based on the issued or received directional command, that rotor assembly is to be rotated, swung, or tilted in right direction 182 to an angle of 30 degrees with respect to perpendicular axis 187. In this case, controller 190 may generate a signal to activate actuator 156 to rotate rotating sleeve 152 in the right direction 182 until 30 degrees from perpendicular axis 187 is reached. This angular rotation may position rotor assembly 160 to vector the thrust generated by assembly 160 in the angular direction. This exemplary angular rotation (e.g., of 30 degrees in the right direction) may be determined to execute (or facilitate execution of) the directional command. In some embodiments, as described in more detail below, each of a plurality of rotating pylons may be rotated, swung, or tilted to execute (or facilitate execution of) the directional command, in combination with rotating pylon assembly 150.

Figure 3A:
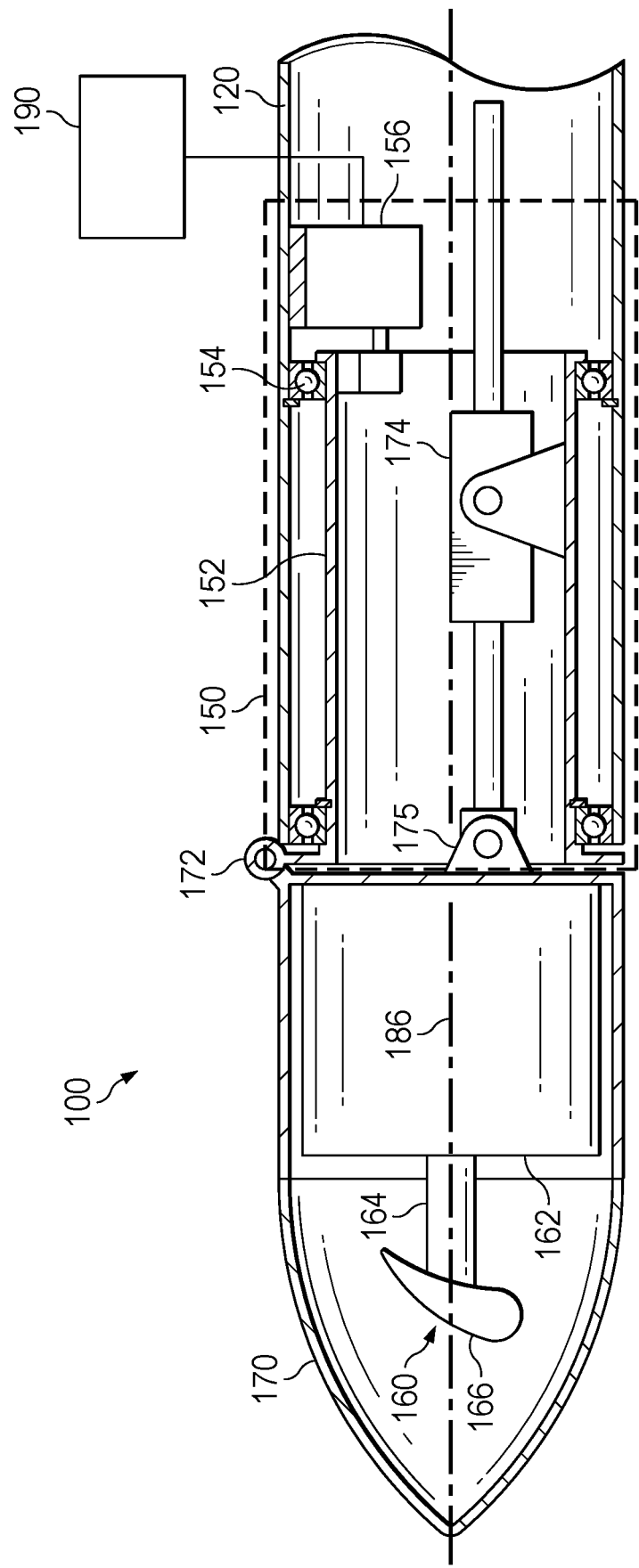
FIG. 3A is a diagram of another implementation of an exemplary system configured with capabilities and functionality for implementing a rotating pylon assembly for aircraft thrust vectoring control in accordance with embodiments of the present disclosure.

FIG. 3A is a diagram of another implementation of exemplary system 100 configured with capabilities and functionality for implementing a rotating pylon assembly for aircraft thrust vectoring control in accordance with embodiments of the present disclosure. In particular, the exemplary embodiment illustrated in FIG. 3A includes implementation of rotating pylon assembly 150 in functional cooperation with a tilting pylon 170.

As shown in FIG. 3A, tilting pylon 170 may include rotor assembly 160, which may include motor 162, rotor mast 164, and one or more rotor blades 166, which may be functionality similar to the components of rotor assembly 160 as described with reference to FIGS. 2A-2C. In embodiments, titling pylon 170 may be configured to be positioned near or at the forward end of fixed boom 120. For example, as illustrated in FIG. 3D, which is a diagram illustrating a configuration of exemplary system 100 configured with capabilities and functionality for implementing a rotating pylon assembly for aircraft thrust vectoring control in accordance with embodiments of the present disclosure, system 100 may be positioned near or at the forward end of fixed boom 120. It is noted that, in some embodiments, the configuration illustrated in FIGS. 2A-2C may be configured to be positioned near or at the tail end of fixed boom 120, or in some cases simply not at the forward end of fixed boom 120.

In embodiments, tilting pylon 170 may be configured to be tiltable between a first position when the aircraft is in a cruise mode and a second position when the aircraft is in a hover mode. The configuration shown in FIG. 3A is when the aircraft is in cruise mode. In this configuration, tilting pylon 170 may be tilted down such that the axis of rotation of rotor assembly 160 is perpendicular to longitudinal axis 186 of fixed boom 120. In this case, the thrust of rotor assembly 160 may be directed upwards. The tiltable configuration of tilting pylon 170 may include a tilt actuator 174 attached to an actuator hinge 175. Tilt actuator 174 may be configured as a linear actuator configured to provide a linear force to push and pull against tilting pylon 170 causing tilting pylon 170 to hinge about tilt hinge 172 to the second position. For example, FIG. 3B is a diagram illustrating a hover configuration of exemplary system 100 configured with capabilities and functionality for implementing a rotating pylon assembly for aircraft thrust vectoring control in accordance with embodiments of the present disclosure. In this hover mode configuration, tilting pylon 170 may be tilted up such that the axis of rotation of rotor assembly 160 is parallel to longitudinal axis 186 of fixed boom 120. In this case, the thrust of rotor assembly 160 may be directed upwards. In embodiments, tilt actuator 174 may be actuated to pull at actuator hinge 175 to tilt tilting pylon 170 down into the first position (e.g., the cruise position as illustrated in FIG. 3A).

With reference back to FIG. 3A, rotating pylon assembly 150 may be configured with functionality similar to the functionality of rotating pylon assembly 150 as illustrated in and described with reference to FIGS. 2A-2C. In particular, rotating pylon assembly 150 may include rotating sleeve 152 disposed inside or within fixed boom 120 and functionally coupled to the interior surface of fixed boom 120 using one or more bearings 154 which may be disposed between rotating sleeve 152 and the interior surface of fixed boom 120 to allow rotating sleeve 152 to rotate against the interior surface of fixed boom 120 about longitudinal axis 186 of fixed boom 120. However, in this configuration illustrated in FIG. 3A, no slot is used, as rotor assembly 160 is not attached to rotating sleeve 152, but rather rotor assembly 160 is securely attached to tilting pylon 170. In this case, it is tilting pylon 170 that is securely attached to rotating sleeve 152. For example, tilt hinge 172 and/or tilt actuator 174 may be fixedly coupled or securely attached to rotating sleeve 152. In embodiments, neither tilt hinge 172 nor tilt actuator 174 (nor other components of tilting pylon 170) may be securely attached to fixed boom 120. In embodiments, actuator 156 may be activated to rotate rotating sleeve 152 about longitudinal axis 186, which may cause tilting pylon 170 to rotate about longitudinal axis 186.

Figure 3C:
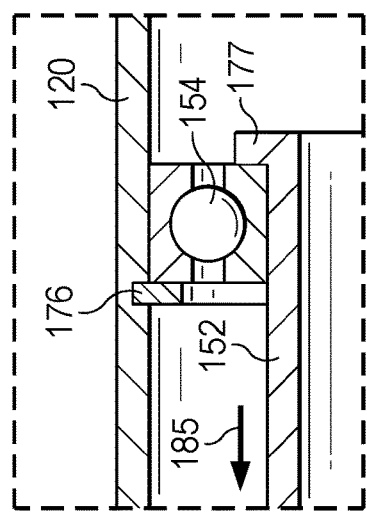
FIG. 3C is a diagram illustrating a configuration of a retaining mechanism for an exemplary system configured with capabilities and functionality for implementing a rotating pylon assembly for aircraft thrust vectoring control in accordance with embodiments of the present disclosure.
Figure 3B:
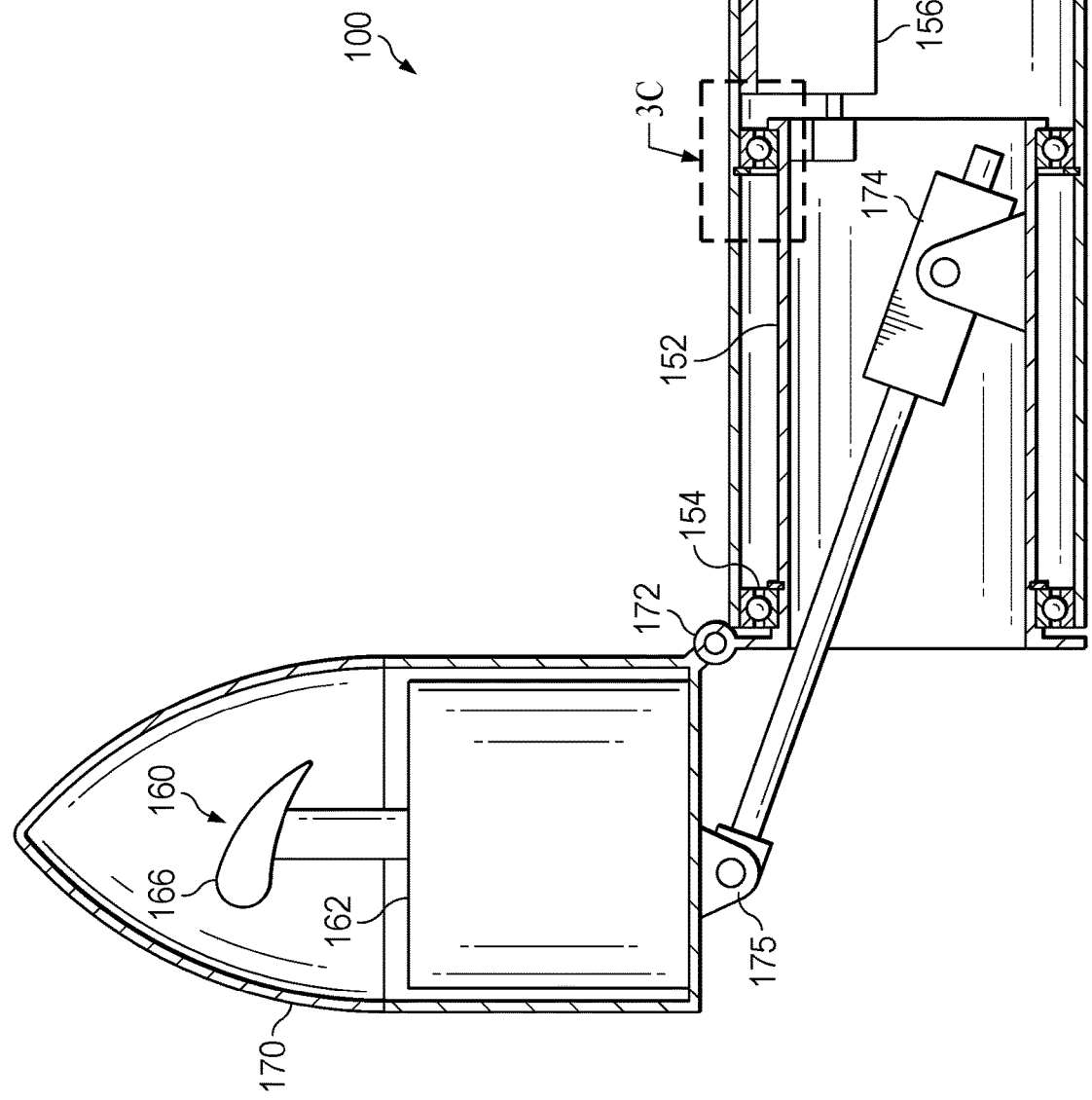
FIG. 3B is a diagram illustrating a hover configuration of the exemplary system configured with capabilities and functionality for implementing a rotating pylon assembly for aircraft thrust vectoring control in accordance with embodiments of the present disclosure.
Figure 3D:
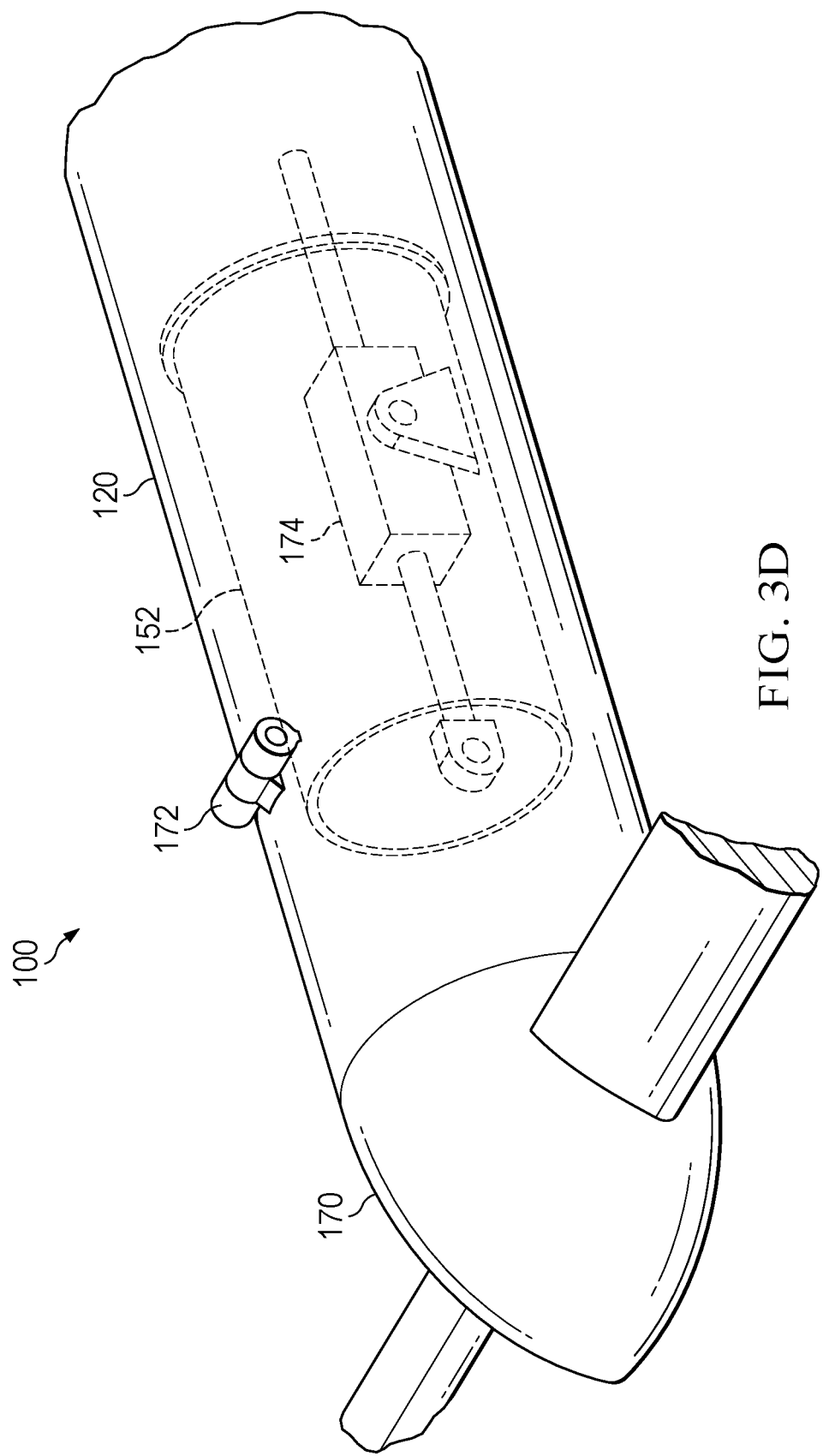
FIG. 3D is a diagram illustrating a configuration of the exemplary system configured with capabilities and functionality for implementing a rotating pylon assembly for aircraft thrust vectoring control in accordance with embodiments of the present disclosure.

In embodiments, as illustrated in FIG. 3C, system 100 may include a retaining mechanism configured to prevent rotating pylon from being displaced to outside (e.g., pulled out of) of the interior of fixed boom 120, which may also prevent tilting pylon, along with rotor assembly 160, from separating from fixed boom 120. For example, a retainer 176 securely attached to the interior surface of fixed boom 120 may function to prevent bearing 154 from moving too much toward the front end of fixed boom 120 in direction 185 such that bearing 154, which may be securely attached to rotating sleeve 152, is prevented from being pulled to the outside of fixed boom 120. In embodiments, retainer 177 securely attached to rotating surface 152 may be configured to stop against bearing 154, which may prevent rotating sleeve from moving too much toward the front end of fixed boom 120 in direction 185 such that rotating sleeve 152 may be prevented from being pulled to the outside of fixed boom 120.

It is noted that in the cruise mode, rotating tilting pylon 170 about longitudinal axis 186 may not affect a movement of the aircraft, as the axis of rotation of rotor assembly 160 may be perpendicular to longitudinal axis 186 of fixed boom 120. However, in the hover mode, as the axis of rotation of rotor assembly 160 may be parallel to longitudinal axis 186 of fixed boom 120, rotating tilting pylon 170 about longitudinal axis 186 may affect a movement of the aircraft based on the direction and angle of the rotation.

As noted above, the functionality and/or operations described with respect to FIGS. 2A-3D are described from the perspective of a single rotating pylon 150. However, in operations, more than one rotating pylon 150 may be used for thrust vectoring control in accordance with embodiments of the present disclosure. FIGS. 4A-4D illustrate example operations of a multi-rotor aircraft 400 configured with one or more rotating pylons configured with capabilities and functionality for aircraft thrust vectoring control in accordance with embodiments of the present disclosure.

As shown, multi-rotor aircraft 400 may include forward rotor assembly 170a, which may be installed on the right-side of multi-rotor aircraft 400 (e.g., to the right boom), forward rotor assembly 170b, which may be installed on the left-side of multi-rotor aircraft 400 (e.g., to the left boom), rear rotor assembly 160a, which may be installed on the right-side of multi-rotor aircraft 400 (e.g., to the right boom), and rear rotor assembly 160b, which may be installed on the left-side of multi-rotor aircraft 400 (e.g., to the left boom). In embodiments, each of rotor assemblies 160a, 160b, 170a, and 170b may be functionally coupled to a rotating pylon assembly with capabilities and functionality as described with respect to FIGS. 2A-2C and 3A-3D. For example, forward rotor assembly 170a and forward rotor assembly 170b, each of which may mounted on a tilting pylon, may be functionally coupled to a rotating pylon assembly as described with reference to FIGS. 3A-3D. In this example, each of rear rotor assembly 160a and rear rotor assembly 160b may be functionally coupled to a rotating pylon assembly as described with reference to FIGS. 2A-2C.

During operation, a directional command specifying a direction along which the aircraft is to move may be received by a controller (e.g., controller 190 of FIGS. 2A-3D). For example, a pilot of multi-rotor aircraft 400 may request a directional change or motion (e.g., using a control stick, or other means for controlling the direction of multi-rotor aircraft 400). The directional command may include a direction of change (e.g., yaw, pitch, roll, etc.) and a rate of change (e.g., how fast the directional change is to be performed). In response to the received directional command, the controller may cause one or more rotating pylon assemblies to rotate in a rotation direction (e.g., including direction and angle) to position the respective rotor assemblies in a position to vector the thrust generated by each of the rotor assemblies in a direction that may enable the aircraft to move in the direction specified in the directional command. For example, in some embodiments, the directional command may specify a change (e.g., a rate of change) in a particular orientation, such as a pitch, roll, and/or yaw change. In these embodiments, the controller may cause one or more rotating pylon assemblies to rotate in a rotation direction (e.g., including direction and angle) to position the respective rotor assemblies in a position to vector the thrust generated by each of the rotor assemblies to effect the change (e.g., yaw, roll, and/or pitch) based on the rate specified in the directional command.

In some embodiments, the directional command specifying a direction along which the aircraft is to move may specify a translational change, in which the aircraft is requested to move in a side-to-side translational direction. For example, with reference to FIG. 4A, the directional command may specify a translational change in the left direction 412 (e.g., a translation move toward the left side of multi-rotor aircraft 400. In this example, the controller may determine an angular rotation (e.g., direction and angle) for each of rotor assemblies 160a, 160b, 170a, and 170b to execute the rotational move about aircraft longitudinal axis 410 in accordance with the directional command. In this example, the controller may determine that each of rotor assemblies 160a, 160b, 170a, and 170b is to be rotated, swung, or tilted toward the left of side of multi-rotor aircraft 400. The angle of the rotation of each of rotor assemblies 160a, 160b, 170a, and 170b may be based on the rate of the left-side translational move requested in the directional command. For example, the controller may determine a smaller rotation angle toward the left side of multi-rotor aircraft 400 for a lower rate left-side translational move than the larger rotation angle toward the left side of multi-rotor aircraft 400 for a higher rate left-side translational move. In some embodiments, a mapping may be used to determine the rotation angle for the left-side translational move, where the mapping maps different rotation angles to corresponding rates of left-side translational move. In some embodiments, the rotation angle for the left-side translation move may be based on an equation transforming a rate of left-side translation motion to a rotation angle for the rotor assemblies. In embodiments, each of rotor assemblies 160a, 160b, 170a, and 170b may be rotated, swung, or tilted toward the left side of multi-rotor aircraft 400 in accordance with the determined angular rotation to execute the left-side rotational move in the left direction 412 in accordance with the directional command.

Figure 4A:
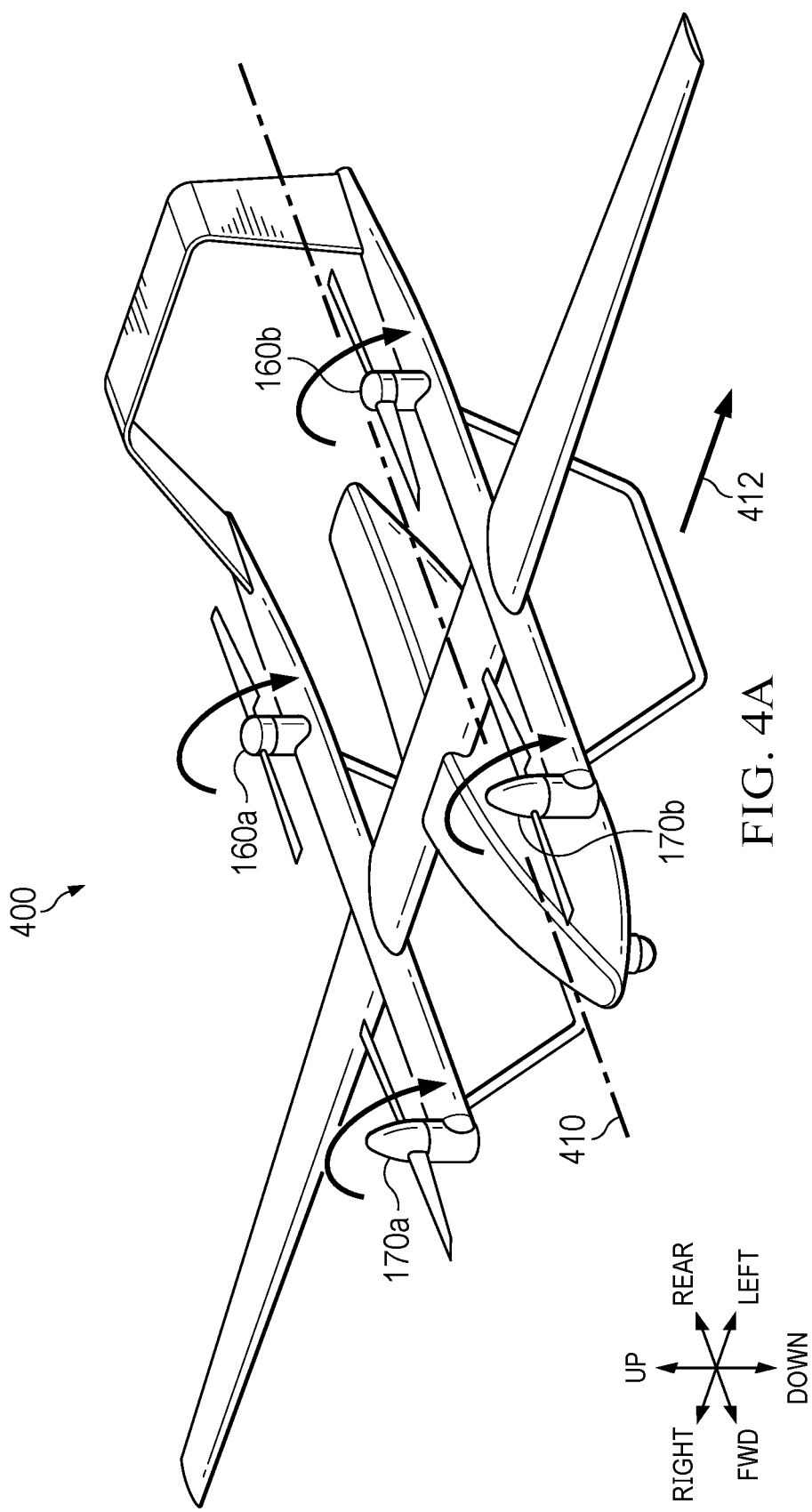
FIGS. 4A-4D illustrate example operations of a multi-rotor aircraft configured with one or more rotating pylons configured with capabilities and functionality for aircraft thrust vectoring control in accordance with embodiments of the present disclosure.
Figure 4B:
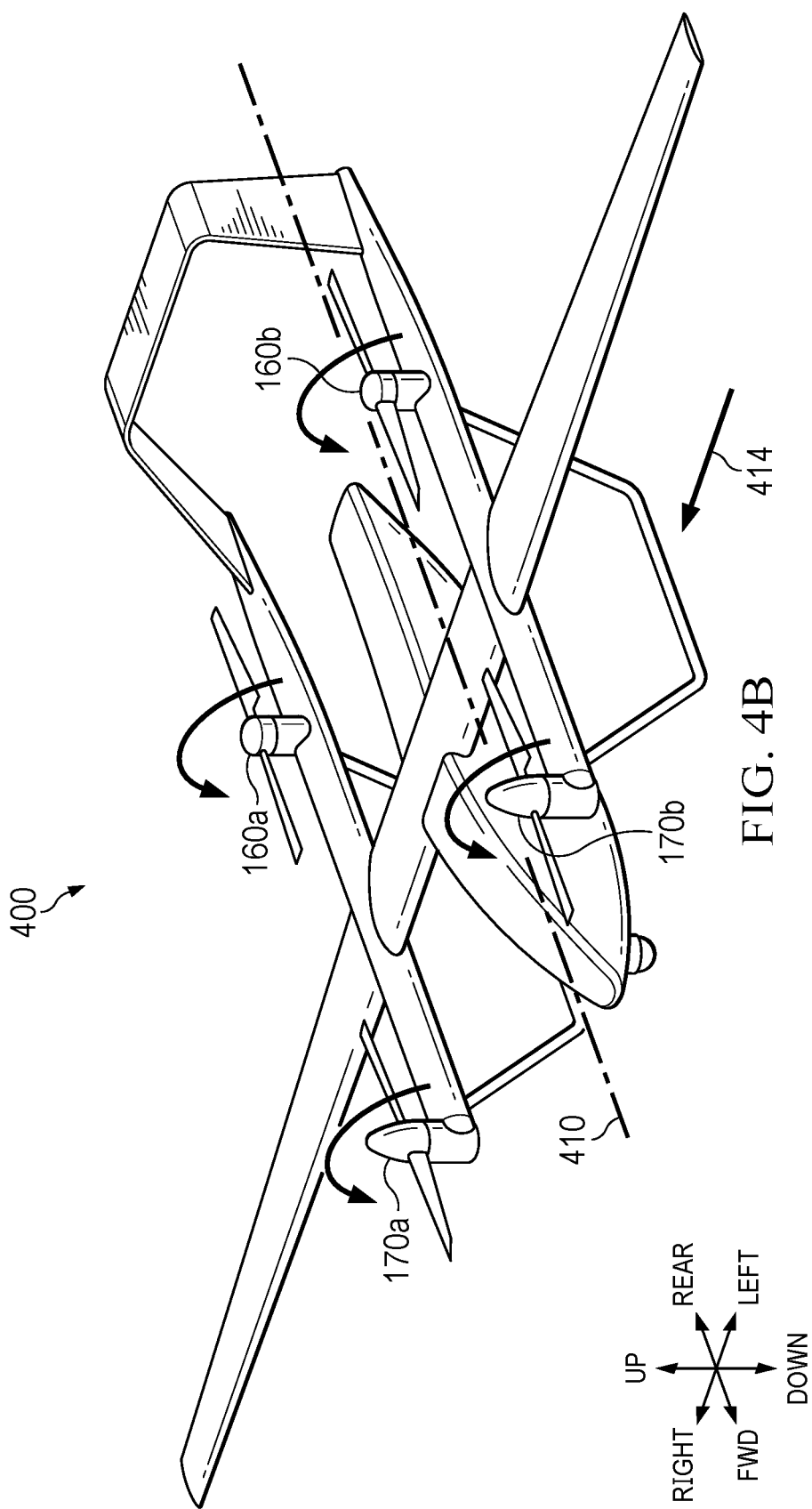

With reference to FIG. 4B, the directional command may specify a translational change in the right direction 414 (e.g., a translation move toward the right side of multi-rotor aircraft 400. In this example, the controller may determine an angular rotation (e.g., direction and angle) for each of rotor assemblies 160a, 160b, 170a, and 170b to execute the rotational move about aircraft longitudinal axis 410 in accordance with the directional command. In this example, the controller may determine that each of rotor assemblies 160a, 160b, 170a, and 170b is to be rotated, swung, or tilted toward the right of side of multi-rotor aircraft 400. The angle of the rotation of each of rotor assemblies 160a, 160b, 170a, and 170b may be based on the rate of the right-side translational move requested in the directional command. For example, the controller may determine a smaller rotation angle toward the right side of multi-rotor aircraft 400 for a lower rate right-side translational move than the larger rotation angle toward the right side of multi-rotor aircraft 400 for a higher rate right-side translational move. In some embodiments, a mapping may be used to determine the rotation angle for the right-side translational move, where the mapping maps different rotation angles to corresponding rates of right-side translational move. In some embodiments, the rotation angle for the right-side translation move may be based on an equation transforming a rate of right-side translation motion to a rotation angle for the rotor assemblies. In embodiments, each of rotor assemblies 160a, 160b, 170a, and 170b may be rotated, swung, or tilted toward the right side of multi-rotor aircraft 400 in accordance with the determined angular rotation to execute the right-side rotational move in the left direction 412 in accordance with the directional command.

Figure 4C:
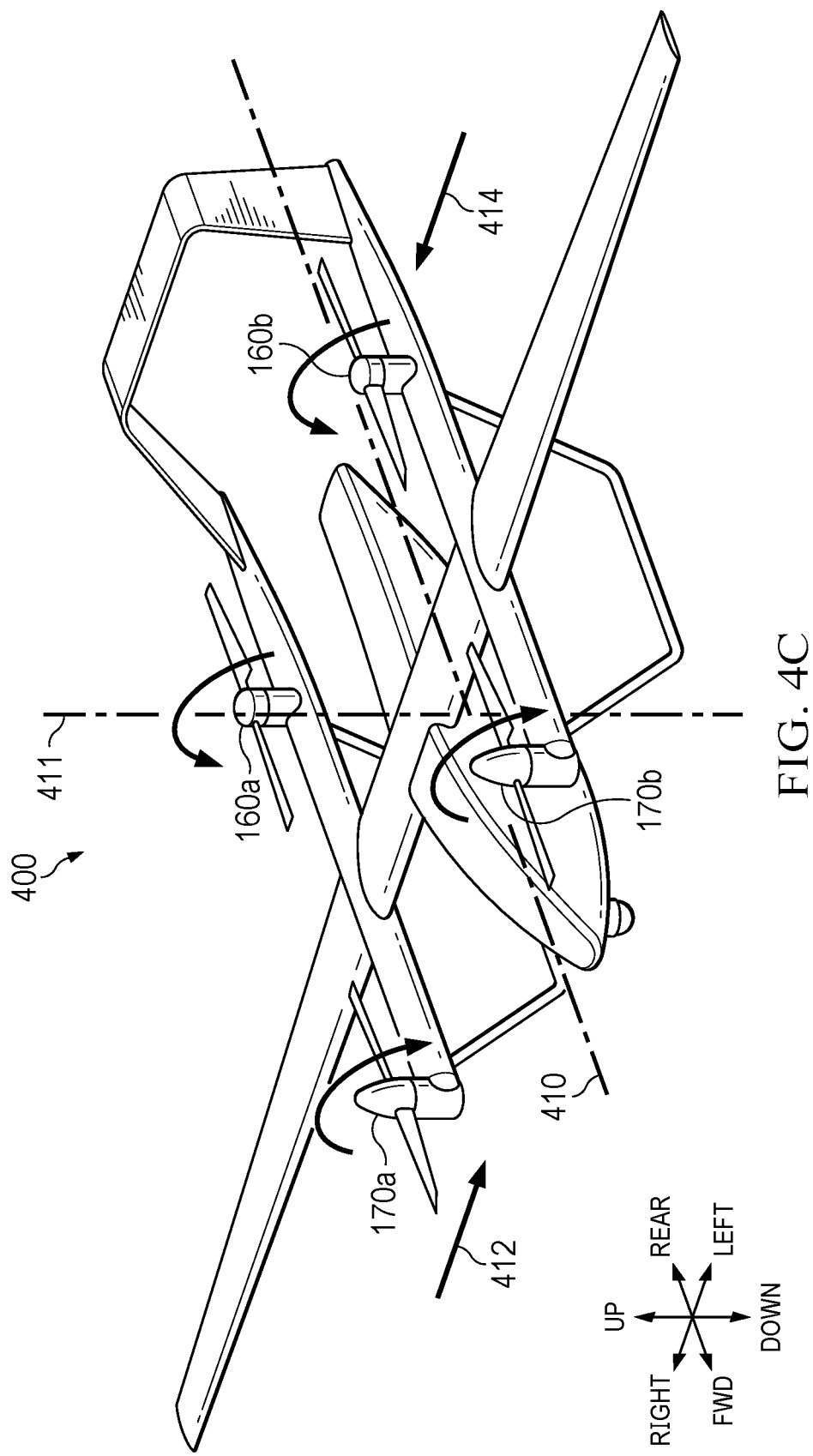

With reference to FIG. 4C, the directional command may specify a yaw change in the left direction. In embodiments, a yaw maneuver in the left direction may include rotating multi-rotor aircraft 400 about aircraft rotation axis 411 such that the forward end of multi-rotor aircraft 400 is rotated in the left direction 412 toward the left side of multi-rotor aircraft 400, while the rear end of multi-rotor aircraft 400 may rotate in the right direction 414. In some embodiments, aircraft rotation axis 411 may represent an axis through the center of gravity of multi-rotor aircraft 400. In this example, the controller may determine an angular rotation (e.g., direction and angle) for each of rotor assemblies 160a, 160b, 170a, and 170b to execute the rotational move in accordance with the directional command. For example, the controller may determine that each of forward rotor assemblies 170a, and 170b is to be rotated, swung, or tilted about aircraft longitudinal axis 410 toward the left of side of multi-rotor aircraft 400, while each of rear rotor assemblies 160a, and 160b is to be rotated, swung, or tilted about aircraft longitudinal axis 410 toward the right of side of multi-rotor aircraft 400. This rotation of the forward rotor assemblies and the rear rotor assemblies in the opposite rotational direction may cause multi-rotor aircraft 400 to rotate or spin such that its nose yaws toward the left side. The angle of the rotation of each of rotor assemblies 160a, 160b, 170a, and 170b may be based on the rate of the left yaw move requested in the directional command. In embodiments, a smaller rotation angle may cause a lower yaw rate than larger rotation angle. In some embodiments, a mapping may be used to determine the rotation angle for the left yaw move, where the mapping maps different rotation angles for the forward rotor assemblies and the rear rotor assemblies to corresponding left yaw rates. In some embodiments, the rotation angle for the left yaw move may be based on an equation transforming a left yaw rate to rotation angles for the forward rotor assemblies and the rear rotor assemblies. In embodiments, each of rotor assemblies 160a, 160b, 170a, and 170b may be rotated, swung, or tilted in accordance with the determined angular rotation to execute the left yaw move in accordance with the directional command.

Figure 4D:
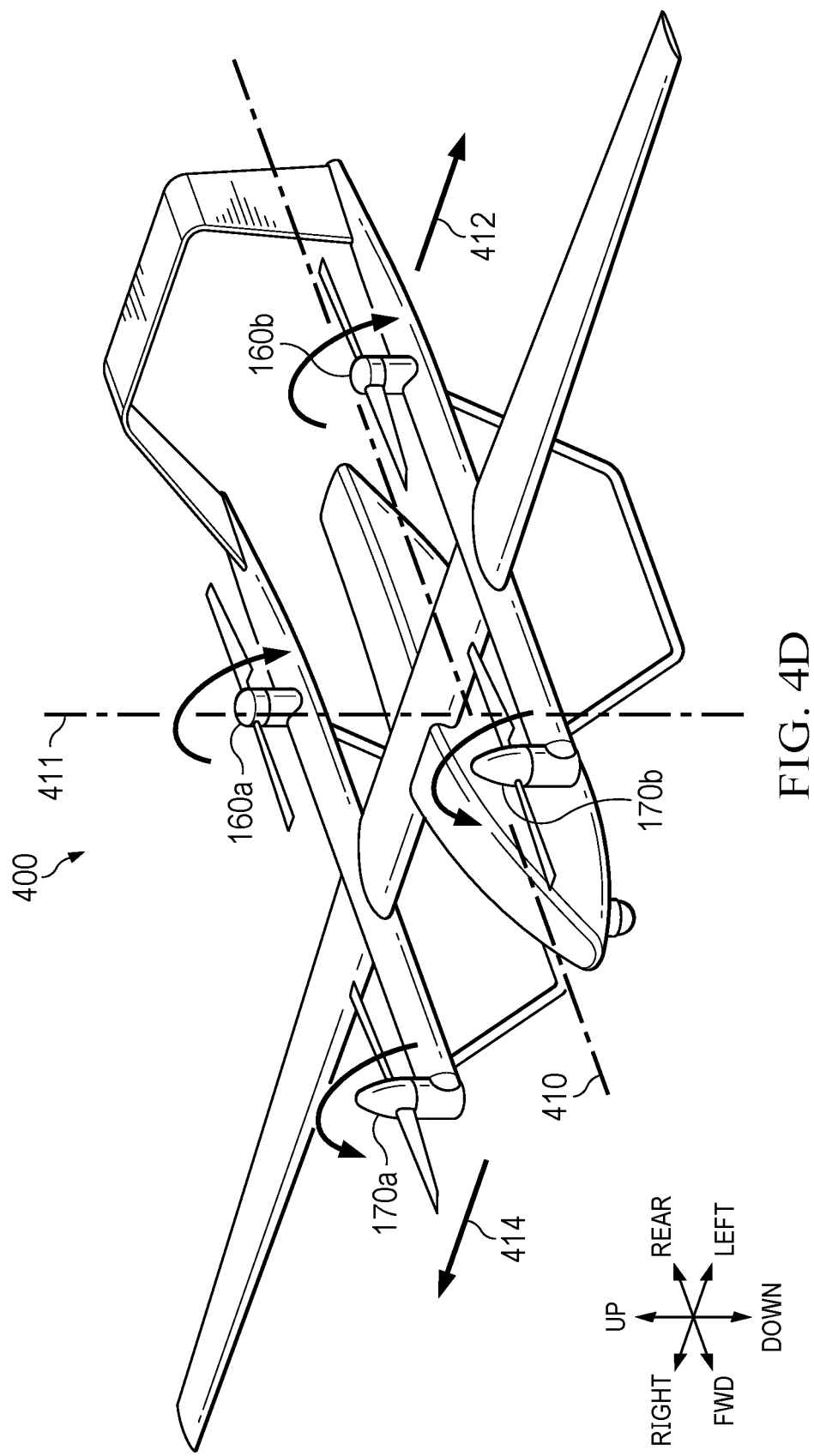

With reference to FIG. 4D, the directional command may specify a yaw change in the right direction. In embodiments, a yaw maneuver in the left direction may include rotating multi-rotor aircraft 400 about aircraft rotation axis 411 such that the forward end of multi-rotor aircraft 400 is rotated in the right direction 414 toward the right side of multi-rotor aircraft 400, while the rear end of multi-rotor aircraft 400 may rotate in the left direction 412. In this example, the controller may determine an angular rotation (e.g., direction and angle) for each of rotor assemblies 160a, 160b, 170a, and 170b to execute the rotational move in accordance with the directional command. For example, the controller may determine that each of forward rotor assemblies 170a, and 170b is to be rotated, swung, or tilted about aircraft longitudinal axis 410 toward the right of side of multi-rotor aircraft 400, while each of rear rotor assemblies 160a, and 160b is to be rotated, swung, or tilted about aircraft longitudinal axis 410 toward the left of side of multi-rotor aircraft 400. This rotation of the forward rotor assemblies and the rear rotor assemblies in the opposite rotational direction may cause multi-rotor aircraft 400 to rotate or spin such that its nose yaws toward the right side. The angle of the rotation of each of rotor assemblies 160a, 160b, 170a, and 170b may be based on the rate of the right yaw move requested in the directional command. In embodiments, a smaller rotation angle may cause a lower yaw rate than larger rotation angle. In some embodiments, a mapping may be used to determine the rotation angle for the right yaw move, where the mapping maps different rotation angles for the forward rotor assemblies and the rear rotor assemblies to corresponding right yaw rates. In some embodiments, the rotation angle for the right yaw move may be based on an equation transforming a right yaw rate to rotation angles for the forward rotor assemblies and the rear rotor assemblies. In embodiments, each of rotor assemblies 160a, 160b, 170a, and 170b may be rotated, swung, or tilted in accordance with the determined angular rotation to execute the right yaw move in accordance with the directional command.

Figure 5A:
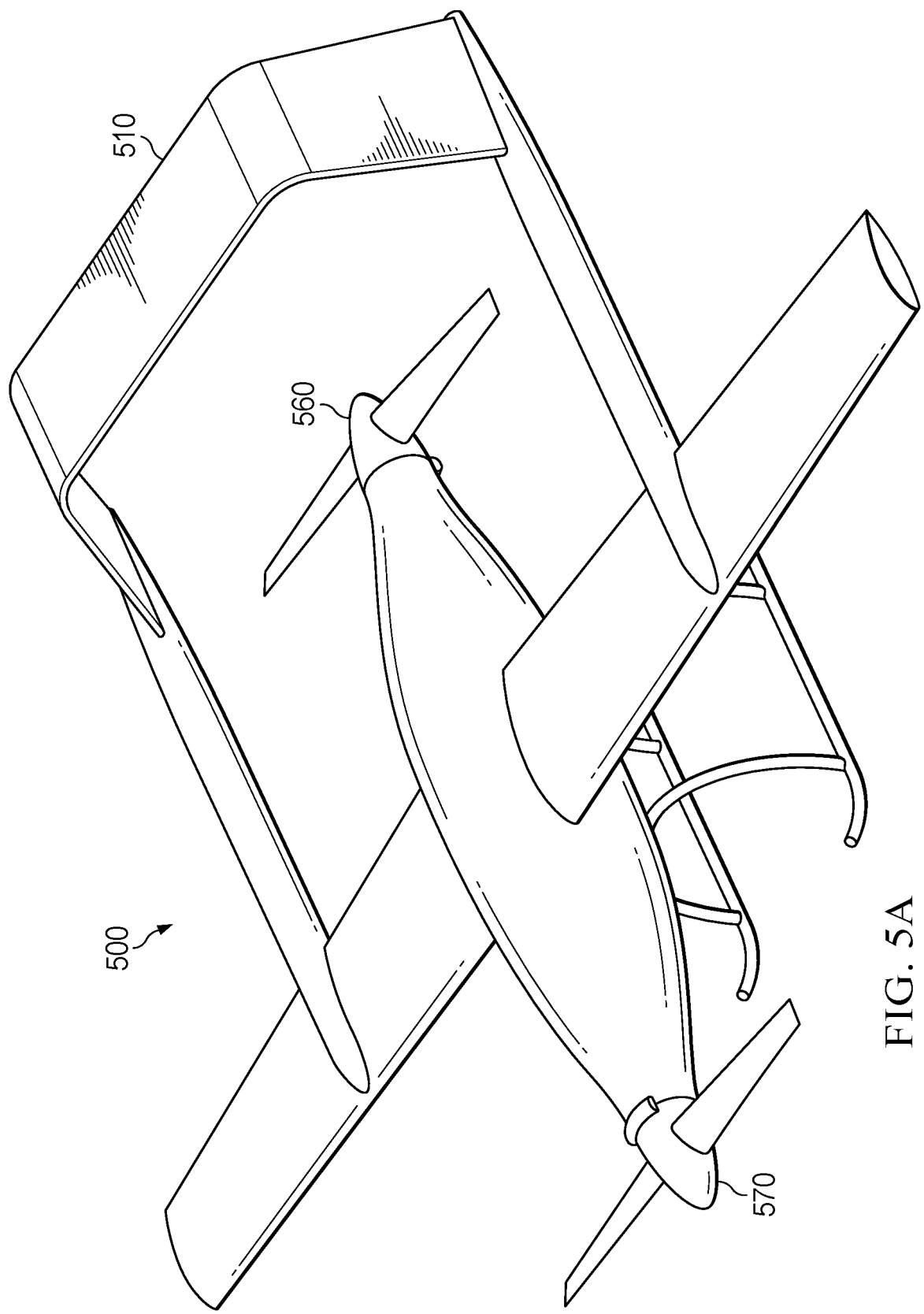
FIGS. 5A and 5B illustrate an exemplary two-rotor aircraft configured with one or more rotating pylons configured with capabilities and functionality for aircraft thrust vectoring control in accordance with embodiments of the present disclosure.
Figure 5B:
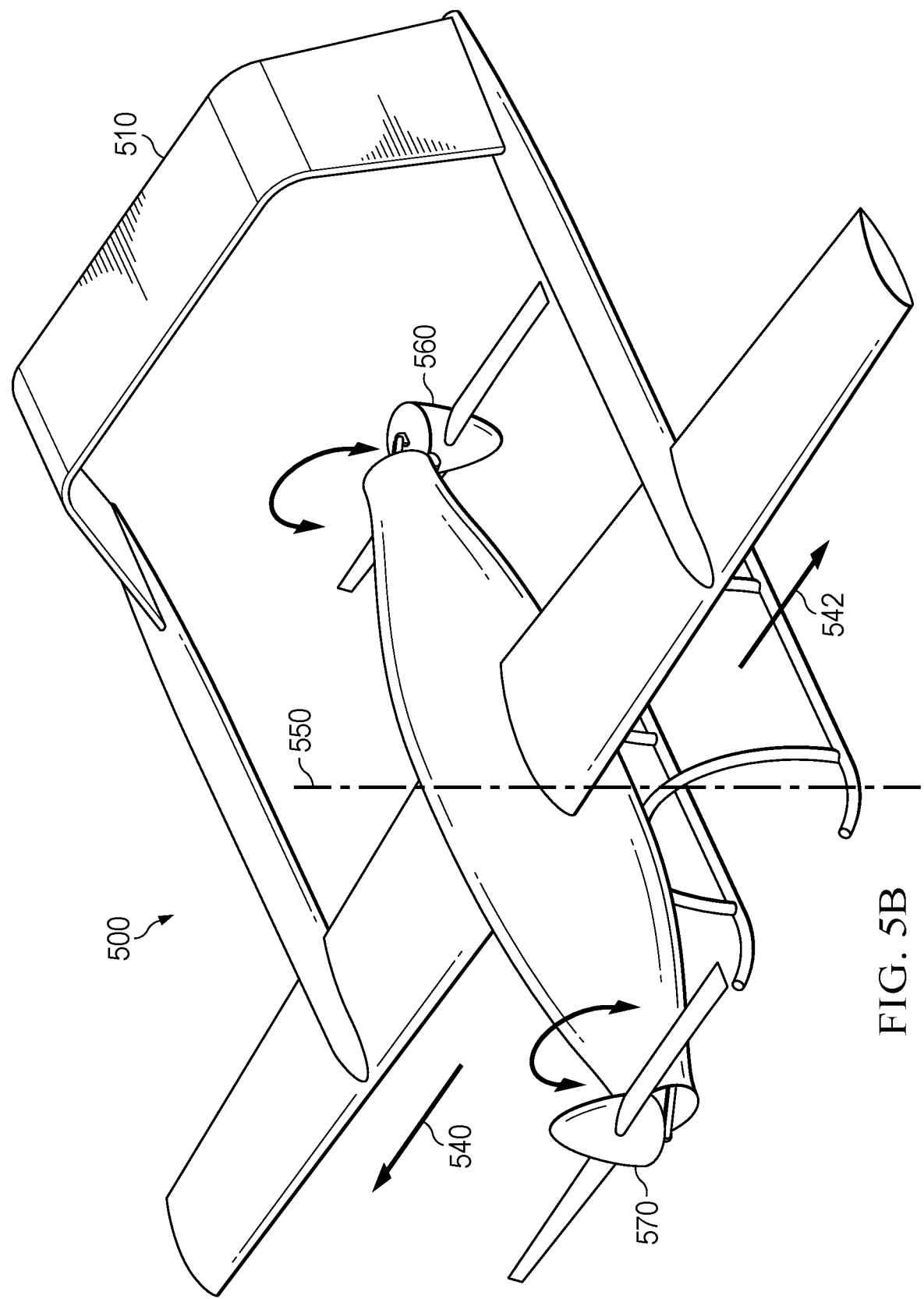

FIGS. 5A and 5B illustrate an exemplary two-rotor aircraft 500 configured with one or more rotating pylons configured with capabilities and functionality for aircraft thrust vectoring control in accordance with embodiments of the present disclosure. As shown in FIGS. 5A and 5B, aircraft 500 may be configured with a forward rotor assembly 570 disposed near or at the forward end of aircraft 500, and aft rotor assembly 560 disposed near or at the rear end of aircraft 500. In this example implementation, forward rotor assembly 570 and aft rotor assembly 560 may be mounted on a tilting pylon, allowing forward rotor assembly 570 and aft rotor assembly 560 to be tilted up and/or down, as described with reference to FIGS. 3A-3D, to position the rotor assemblies based on a particular flight mode. In particular, the example configuration shown in FIG. 5A may represent a cruising mode in which forward rotor assembly 570 and aft rotor assembly 560 may be positioned for horizontal flight. In embodiments, a tail section 510 may be implemented for facilitating the horizontal flight mode. The example configuration shown in FIG. 5B may represent a hovering or VTOL mode in which forward rotor assembly 570 and aft rotor assembly 560 may be positioned, such as by operation of the tilting pylon to which each respective rotor assembly is functionally coupled, for hovering or vertical takeoff.

In embodiments, each of rotor assemblies 560 and 570 may be functionally coupled to a rotating pylon assembly with capabilities and functionality as described in embodiments of the present disclosure. For example, forward rotor assembly 570 and aft rotor assembly 560, each of which may mounted on a tilting pylon, may be functionally coupled to a rotating pylon assembly as described with reference to FIGS. 3A-3D.

In embodiments, during operation, a directional command specifying a direction along which aircraft 500 is to move may be received by a controller (e.g., controller 190 of FIGS. 2A-3D). For example, the directional command may specify a translation maneuver or move in the left direction 542. In this case, in response to the requested left translation maneuver, the controller may cause both the rotating pylon assembly to which forward rotor assembly 570 is mounted and the rotating pylon assembly to which aft rotor assembly 560 is mounted to rotate, swivel, swing, or tilt toward the left direction 542 (e.g., including direction and angle) to position both forward rotor assembly 570 and aft rotor assembly 560 to vector the thrust generated by each of forward rotor assembly 570 and aft rotor assembly 560 to enable aircraft 500 to translate in the left direction 542.

In another example, the directional command specifying a direction along which aircraft 500 is to move may specify a translation maneuver in the right direction 540. In this case, in response to the requested right translation maneuver, the controller may cause both the rotating pylon assembly to which forward rotor assembly 570 is mounted and the rotating pylon assembly to which aft rotor assembly 560 is mounted to rotate, swivel, swing, or tilt toward the right direction 540 (e.g., including direction and angle) to position both forward rotor assembly 570 and aft rotor assembly 560 to vector the thrust generated by each of forward rotor assembly 570 and aft rotor assembly 560 to enable aircraft 500 to translate in the right direction 540.

In yet another example, the directional command specifying a direction along which aircraft 500 is to move may specify a yaw maneuver to the right direction 540 (e.g., a yaw move to cause the nose of aircraft 500 to rotate about rotation axis 550 toward the right direction 540, while the rear end of aircraft 500 may rotate about rotation axis 550 toward the left direction 542) causing aircraft 500 to rotate clockwise about rotation axis 550 when viewed from above aircraft 500. In this case, in response to the requested right yaw maneuver, the controller may cause the rotating pylon assembly to which forward rotor assembly 570 is mounted to rotate, swivel, swing, or tilt toward the right direction 540 (e.g., including direction and angle) to position forward rotor assembly 570 to vector the thrust generated by forward rotor assembly 570 to enable the forward end of aircraft 500 to rotate toward the right direction 540, and may cause the rotating pylon assembly to which aft rotor assembly 560 is mounted to rotate, swivel, swing, or tilt toward the left direction 542 (e.g., including direction and angle) to position aft rotor assembly 560 to vector the thrust generated by aft rotor assembly 560 to enable the rear end of aircraft 500 to rotate toward the left direction 542.

In still another example, the directional command specifying a direction along which aircraft 500 is to move may specify a yaw maneuver to the left direction 542 (e.g., a yaw move to cause the nose of aircraft 500 to rotate about rotation axis 550 toward the left direction 542, while the rear end of aircraft 500 may rotate about rotation axis 550 toward the right direction 540) causing aircraft 500 to rotate clockwise about rotation axis 550 when viewed from above aircraft 500. In this case, in response to the requested left yaw maneuver, the controller may cause the rotating pylon assembly to which forward rotor assembly 570 is mounted to rotate, swivel, swing, or tilt toward the left direction 542 (e.g., including direction and angle) to position forward rotor assembly 570 to vector the thrust generated by forward rotor assembly 570 to enable the forward end of aircraft 500 to rotate toward the left direction 542, and may cause the rotating pylon assembly to which aft rotor assembly 560 is mounted to rotate, swivel, swing, or tilt toward the right direction 540 (e.g., including direction and angle) to position aft rotor assembly 560 to vector the thrust generated by aft rotor assembly 560 to enable the rear end of aircraft 500 to rotate toward the right direction 540.

Figure 6A:
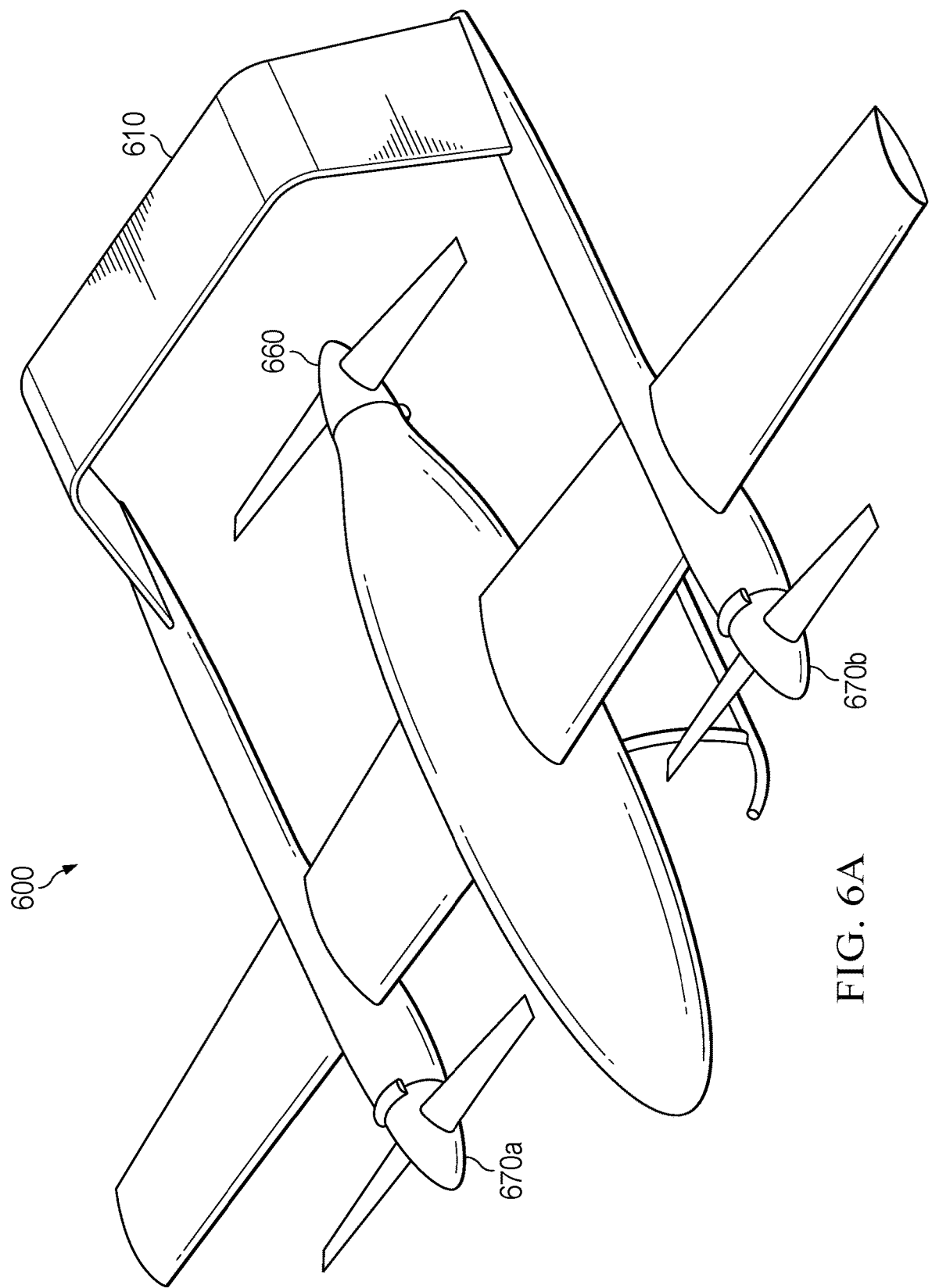
FIGS. 6A and 6B illustrate an exemplary three-rotor aircraft configured with one or more rotating pylons configured with capabilities and functionality for aircraft thrust vectoring control in accordance with embodiments of the present disclosure.
Figure 6B:
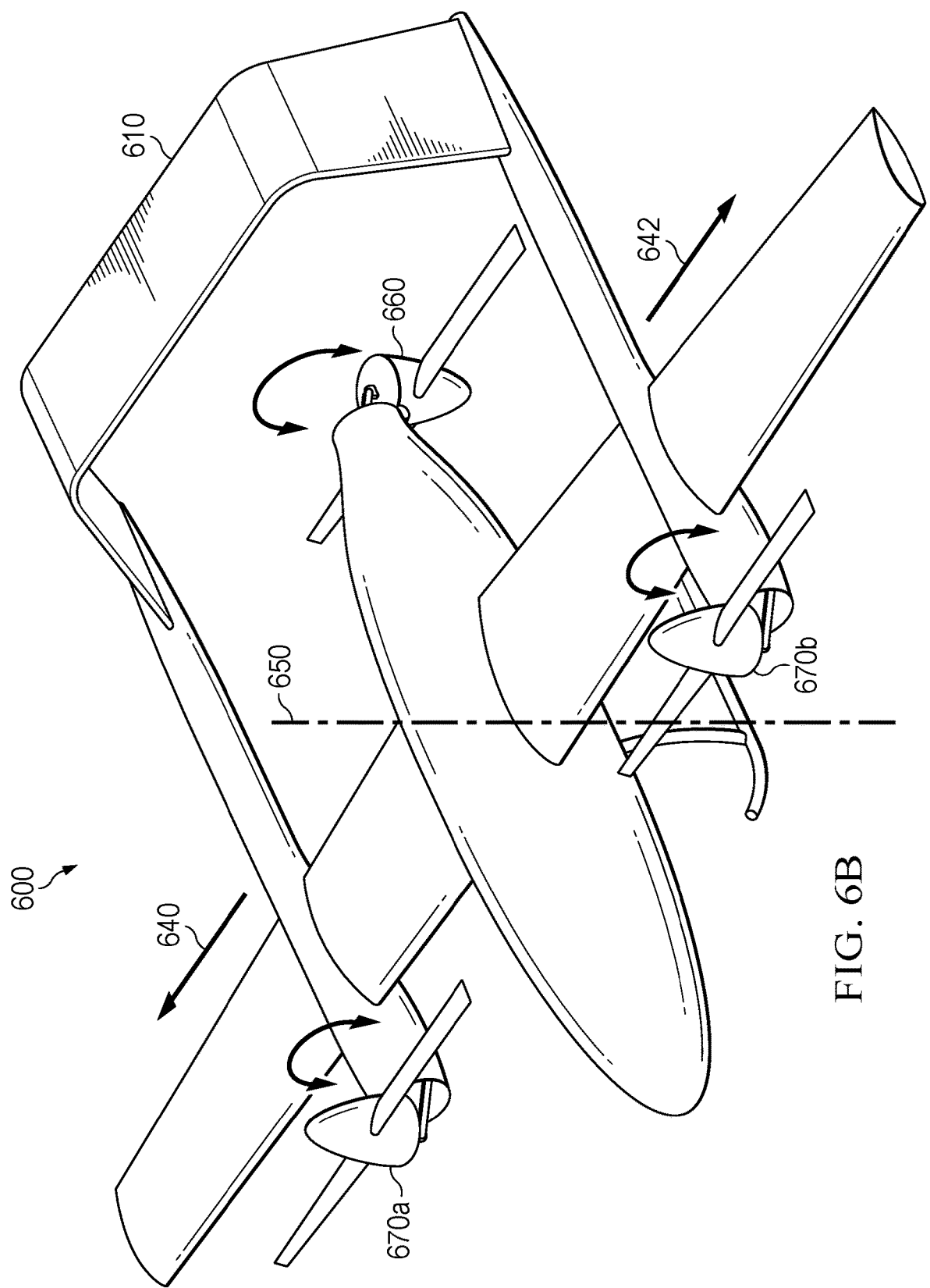

FIGS. 6A and 6B illustrate an exemplary three-rotor aircraft 600 configured with one or more rotating pylons configured with capabilities and functionality for aircraft thrust vectoring control in accordance with embodiments of the present disclosure. As shown in FIGS. 6A and 6B, aircraft 600 may be configured with two forward rotor assemblies, namely right forward rotor assembly 670a, which may be disposed on the front end and the right side of aircraft 600 and left forward rotor assembly 670b, which may be disposed on the front end and left side of aircraft 600, and aft rotor assembly 660 disposed near or at the rear end of aircraft 600. In this example implementation, all of right forward rotor assembly 670a, left forward rotor assembly 670b, and aft rotor assembly 660 may be mounted on a tilting pylon, allowing each of the rotor assemblies to be tilted up and/or down, as described with reference to FIGS. 3A-3D, to position the rotor assemblies based on a particular flight mode. In particular, the example configuration shown in FIG. 6A may represent a cruising mode in which right forward rotor assembly 670a, left forward rotor assembly 670b, and aft rotor assembly 660 may be positioned for horizontal flight. In embodiments, a tail section 610 may be implemented for facilitating the horizontal flight mode. The example configuration shown in FIG. 6B may represent a hovering or VTOL mode in which right forward rotor assembly 670a, left forward rotor assembly 670b, and aft rotor assembly 660 may be positioned, such as by operation of the tilting pylon to which each respective rotor assembly is functionally coupled, for hovering or vertical takeoff.

In embodiments, each of right forward rotor assembly 670a, left forward rotor assembly 670b, and aft rotor assembly 660 may be functionally coupled to a rotating pylon assembly with capabilities and functionality as described in embodiments of the present disclosure. For example, right forward rotor assembly 670a, left forward rotor assembly 670b, and aft rotor assembly 660, each of which may mounted on a tilting pylon, may be functionally coupled to a rotating pylon assembly as described with reference to FIGS. 3A-3D.

In embodiments, during operation, a directional command specifying a direction along which aircraft 600 is to move may be received by a controller (e.g., controller 190 of FIGS. 2A-3D). For example, the directional command may specify a translation maneuver or move in the left direction 642. In this case, in response to the requested left translation maneuver, the controller may cause the rotating pylon assembly to which right forward rotor assembly 670a is mounted, the rotating pylon assembly to which left forward rotor assembly 670b is mounted, and the rotating pylon assembly to which aft rotor assembly 660 is mounted to rotate, swivel, swing, or tilt toward the left direction 642 (e.g., including direction and angle) to position all rotor assemblies to vector the thrust generated by each of right forward rotor assembly 670a, left forward rotor assembly 670b, and aft rotor assembly 660 to enable aircraft 600 to translate in the left direction 642.

In another example, the directional command specifying a direction along which aircraft 600 is to move may specify a translation maneuver in the right direction 640. In this case, in response to the requested right translation maneuver, the controller may cause the rotating pylon assembly to which right forward rotor assembly 670a is mounted, the rotating pylon assembly to which left forward rotor assembly 670b is mounted, and the rotating pylon assembly to which aft rotor assembly 660 is mounted to rotate, swivel, swing, or tilt toward the right direction 640 (e.g., including direction and angle) to position all rotor assemblies to vector the thrust generated by each of right forward rotor assembly 670a, left forward rotor assembly 670b, and aft rotor assembly 660 to enable aircraft 600 to translate in the right direction 640.

In yet another example, the directional command specifying a direction along which aircraft 600 is to move may specify a yaw maneuver to the right direction 640 (e.g., a yaw move to cause the nose of aircraft 600 to rotate about rotation axis 650 toward the right direction 640, while the rear end of aircraft 600 may rotate about rotation axis 650 toward the left direction 642) causing aircraft 600 to rotate clockwise about rotation axis 650 when viewed from above aircraft 600. In this case, in response to the requested right yaw maneuver, the controller may cause the rotating pylon assembly to which right forward rotor assembly 670a is mounted and the rotating pylon assembly to which left forward rotor assembly 670b is mounted to rotate, swivel, swing, or tilt toward the right direction 640 (e.g., including direction and angle) to position both right forward rotor assembly 670a and left forward rotor assembly 670b to vector the thrust generated by right forward rotor assembly 670a and left forward rotor assembly 670b to enable the forward end of aircraft 600 to rotate toward the right direction 640, and may cause the rotating pylon assembly to which aft rotor assembly 660 is mounted to rotate, swivel, swing, or tilt toward the left direction 642 (e.g., including direction and angle) to position aft rotor assembly 660 to vector the thrust generated by aft rotor assembly 660 to enable the rear end of aircraft 600 to rotate toward the left direction 642.

In still another example, the directional command specifying a direction along which aircraft 600 is to move may specify a yaw maneuver to the left direction 642 (e.g., a yaw move to cause the nose of aircraft 600 to rotate about rotation axis 50 toward the left direction 642, while the rear end of aircraft 600 may rotate about rotation axis 650 toward the right direction 640) causing aircraft 600 to rotate clockwise about rotation axis 650 when viewed from above aircraft 600. In this case, in response to the requested left yaw maneuver, the controller may cause the rotating pylon assembly to which right forward rotor assembly 670a is mounted and the rotating pylon assembly to which left forward rotor assembly 670b is mounted to rotate, swivel, swing, or tilt toward the left direction 642 (e.g., including direction and angle) to position both right forward rotor assembly 670a and left forward rotor assembly 670b to vector the thrust generated by right forward rotor assembly 670a and left forward rotor assembly 670b to enable the forward end of aircraft 600 to rotate toward the left direction 642, and may cause the rotating pylon assembly to which aft rotor assembly 660 is mounted to rotate, swivel, swing, or tilt toward the right direction 640 (e.g., including direction and angle) to position aft rotor assembly 660 to vector the thrust generated by aft rotor assembly 660 to enable the rear end of aircraft 600 to rotate toward the right direction 640.

In embodiments, the functionality to rotate, swivel, swing, or tilt aft rotor assembly 660 using a rotating pylon implemented in accordance with embodiments of the present disclosure may provide functionality to counter unbalanced toque generated by the operation of aft rotor assembly 660. For example, a rotation bias may be set for aft rotor assembly 660 (e.g., aft rotor assembly 660 may be rotated or tilted in accordance with embodiments of the present disclosure) in which the angle and rate of tilt may be based on the amount of unbalanced torque determined.

Figure 7:
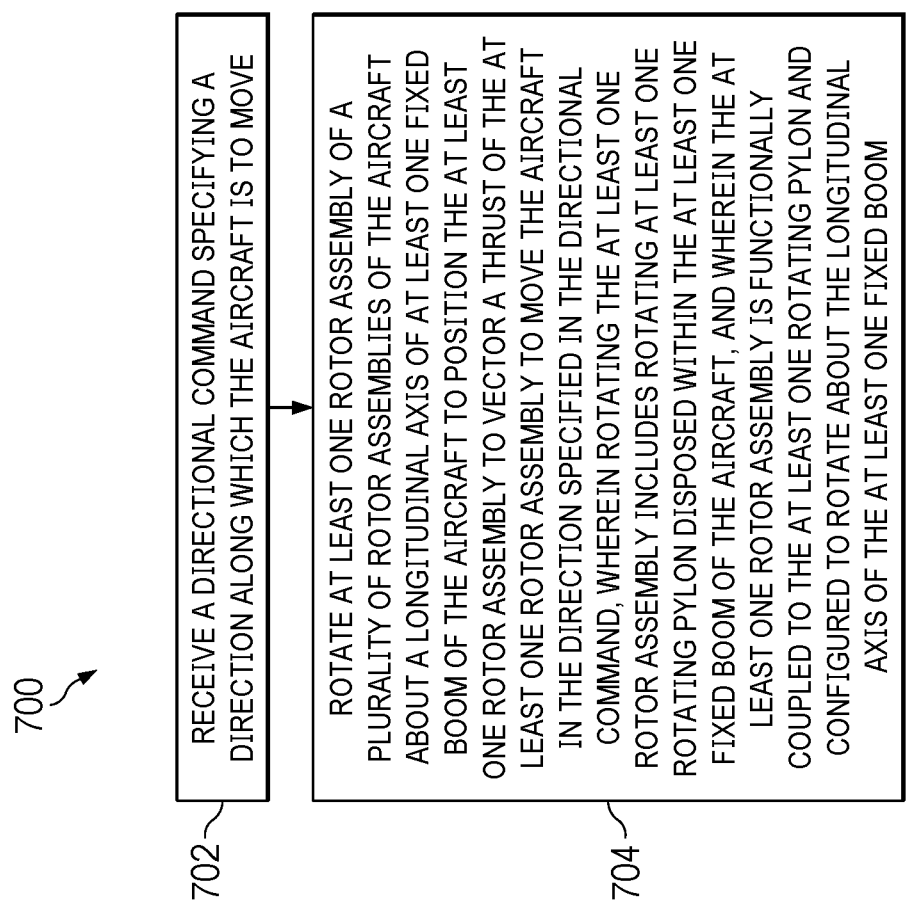
FIG. 7 is a high-level flow diagram of a method for controlling an aircraft in accordance with embodiments of the present disclosure.

FIG. 7 is a high-level flow diagram of a method 700 for controlling an aircraft in accordance with embodiments of the present disclosure. In embodiments, the steps of method 700 may be implemented using a system (e.g., system 100 of FIGS. 2A-3D) implementing one or more rotating pylon assemblies (e.g., rotating pylon assembly 150 of FIGS. 2A-3D).

At block 702, a directional command specifying a direction along which the aircraft is to move is received. For example, in embodiments, a controller (e.g., controller 190 of FIGS. 2A-3D) may receive a directional command specifying a direction along which an aircraft is to move according to configuration and functionality described with respect to embodiments of the present disclosure. In embodiments, the direction along which the aircraft is to move includes one of a side-to-side translational direction or a yaw direction.

At block 704, at least one rotor assembly of a plurality of rotor assemblies of the aircraft is rotated about a longitudinal axis of at least one fixed boom of the aircraft to position the at least one rotor assembly to vector a thrust of the at least one rotor assembly to move the aircraft in the direction specified in the directional command. For example, in embodiments, the controller (e.g., controller 190 of FIGS. 2A-3D) may cause one or more rotating pylon assemblies (e.g., rotating pylon assembly 150 of FIGS. 2A-3D) to rotate in a rotation direction (e.g., including direction and angle) to position the respective rotor assemblies (e.g., rotor assembly 160 of FIGS. 2A-3D) in a position to vector the thrust generated by each of the rotor assemblies in a direction that may enable the aircraft to move in the direction specified in the directional command according to configuration and functionality described with respect to embodiments of the present disclosure.

In embodiments, rotating the at least one rotor assembly to vector the thrust of the at least one rotor assembly to move the aircraft in the direction specified in the directional command includes rotating the at least one rotor assembly to vector the thrust of the at least one rotor assembly to move the aircraft in the direction specified in the directional command includes rotating the at least two rear rotor assemblies and the at least two forward rotor assemblies in the left direction to vector the thrust of each of the at least two rear rotor assemblies and the at least two forward rotor assemblies to move the aircraft to the left in the side-to-side translational direction when the directional command specifies a left side-to-side translation motion.

In embodiments, rotating the at least one rotor assembly to vector the thrust of the at least one rotor assembly to move the aircraft in the direction specified in the directional command includes rotating the at least two rear rotor assemblies and the at least two forward rotor assemblies in the right direction to vector the thrust of each of the at least two rear rotor assemblies and the at least two forward rotor assemblies to move the aircraft to the right in the side-to-side translational direction when the directional command specifies a right side-to-side translation motion.

In embodiments, rotating the at least one rotor assembly to vector the thrust of the at least one rotor assembly to move the aircraft in the direction specified in the directional command includes rotating the at least two rear rotor assemblies in the right direction and the at least two forward rotor assemblies in the left direction to vector the thrust of each of the at least two rear rotor assemblies and the at least two forward rotor assemblies to yaw a forward end of the aircraft in the left direction when the directional command specifies a left yaw motion.

In embodiments, rotating the at least one rotor assembly to vector the thrust of the at least one rotor assembly to move the aircraft in the direction specified in the directional command includes rotating the at least two rear rotor assemblies in the left direction and the at least two forward rotor assemblies in the right direction to vector the thrust of each of the at least two rear rotor assemblies and the at least two forward rotor assemblies to yaw the forward end of the aircraft in the right direction when the directional command specifies a right yaw motion.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are in-tended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112 (f). Even under the broadest reasonable interpretation, in light of this paragraph of this specification, the claims are not intended to invoke 35 U.S.C. § 112 (f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A rotating pylon system configured to facilitate control of an aircraft, comprising:
   a rotating sleeve configured to be disposed within a fixed boom of the aircraft and configured to support a rotor assembly;
   a bearing assembly configured to functionally couple the rotating sleeve against an inner surface of the fixed boom, wherein the bearing assembly enables the rotating sleeve to rotate against the inner surface of the fixed boom and about a longitudinal axis of the fixed boom; and
   an actuator functionally coupled to the rotating sleeve configured to provide a force to rotate the rotating sleeve about the longitudinal axis of the fixed boom to position the rotor assembly based on a control command to vector a thrust provided by the rotor assembly, and wherein the rotating sleeve includes a slot configured to allow the rotor mast of the rotor assembly to at least partially protrude through a slot of the fixed boom.

2. The system of claim 1, further comprising:
   the rotor assembly fixedly mounted to an interior of the rotating sleeve.

3. The system of claim 2, wherein the rotor assembly includes a propeller coupled to a rotor mast, the rotor mast coupled to an electric motor fixedly mounted to the rotating sleeve.

4. The system of claim 3, wherein the slot of the fixed boom is shaped to allow the rotor mast to move through a range of angular degrees of rotation within the slot of the fixed boom to position the rotor assembly based on the control command to vector the thrust provided by the rotor assembly.

5. The system of claim 1, wherein the actuator includes one or more of:
   a rotating actuator configured to provide a rotating force to rotate the rotating sleeve about the longitudinal axis of the fixed boom; and
   a linear actuator configured to provide a linear force causing the rotating sleeve to rotate about the longitudinal axis of the fixed boom.

6. The system of claim 1, wherein the rotating sleeve is fully disposed within the fixed boom of the aircraft.

7. A method of controlling an aircraft, comprising:
   receiving a directional command specifying a direction along which the aircraft is to move;
   rotating at least one rotor assembly of a plurality of rotor assemblies of the aircraft about a longitudinal axis of at least one fixed boom of the aircraft to position the at least one rotor assembly to vector a thrust of the at least one rotor assembly to move the aircraft in the direction specified in the directional command, wherein rotating the at least one rotor assembly includes rotating at least one rotating pylon disposed within the at least one fixed boom of the aircraft, and wherein the at least one rotor assembly is functionally coupled to the at least one rotating pylon and configured to rotate about the longitudinal axis of the at least one fixed boom, wherein a rotating sleeve of the at least one rotating pylon includes a slot configured to allow a rotor mast of the at least one rotor assembly to at least partially protrude through a slot of the fixed boom.

8. The method of claim 7, wherein the direction along which the aircraft is to move includes one of:
   a side-to-side translational direction; or
   a yaw direction.

9. The method of claim 8, wherein the at least one rotor assembly includes:
   at least two rear rotor assemblies each functionally coupled to a respective rear rotating pylon of a plurality of rear rotating pylons, wherein a first rear rotating pylon of the plurality of rear rotating pylons is disposed within a tail end of a right-side boom of the at least one boom and wherein a second rear rotating pylon of the plurality of rear rotating pylons is disposed within a tail end of a left-side boom of the at least one boom; and
   at least two forward rotor assemblies each functionally coupled to a respective forward rotating pylon of a plurality of forward rotating pylons, wherein a first forward rotating pylon of the plurality of forward rotating pylons is disposed within a forward end of the right-side boom of the at least one boom and wherein a second forward rotating pylon of the plurality of forward rotating pylons is disposed within a forward end of the left-side boom of the at least one boom.

10. The method of claim 9, wherein rotating the at least one rotor assembly to vector the thrust of the at least one rotor assembly to move the aircraft in the direction specified in the directional command includes:
    rotating the at least two rear rotor assemblies and the at least two forward rotor assemblies in the left direction to vector the thrust of each of the at least two rear rotor assemblies and the at least two forward rotor assemblies to move the aircraft to the left in the side-to-side translational direction when the directional command specifies a left side-to-side translation motion;
    rotating the at least two rear rotor assemblies and the at least two forward rotor assemblies in the right direction to vector the thrust of each of the at least two rear rotor assemblies and the at least two forward rotor assemblies to move the aircraft to the right in the side-to-side translational direction when the directional command specifies a right side-to-side translation motion;
    rotating the at least two rear rotor assemblies in the right direction and the at least two forward rotor assemblies in the left direction to vector the thrust of each of the at least two rear rotor assemblies and the at least two forward rotor assemblies to yaw a forward end of the aircraft in the left direction when the directional command specifies a left yaw motion; and
    rotating the at least two rear rotor assemblies in the left direction and the at least two forward rotor assemblies in the right direction to vector the thrust of each of the at least two rear rotor assemblies and the at least two forward rotor assemblies to yaw the forward end of the aircraft in the right direction when the directional command specifies a right yaw motion.

11. A tiltrotor aircraft, comprising:
    at least one fixed boom;
    at least one rotor assembly; and
    at least one rotating pylon assembly disposed within the at least one fixed boom, each of the at least one rotating assembly including:

a rotating sleeve configured to be disposed within the at least one fixed boom and configured to support a respective rotor assembly of the at least one rotor assembly;

a bearing assembly configured to functionally couple the rotating sleeve against an inner surface of the at least one fixed boom, wherein the bearing assembly enables the rotating sleeve to rotate against the inner surface of the at least one fixed boom and about a longitudinal axis of the at least one fixed boom; and an actuator functionally coupled to the rotating sleeve configured to provide a force to rotate the rotating sleeve about the longitudinal axis of the at least one fixed boom to position the at least one rotor assembly based on a control command to vector a thrust provided by the at least one rotor assembly, and wherein a rotor mast of the at least one rotor assembly at least partially protrudes through a slot of the at least one fixed boom.

12. The tiltrotor aircraft of claim 11, wherein the at least one rotor assembly is disposed within the at least one rotating assembly.

13. The tiltrotor aircraft of claim 11, wherein the slot of the at least one fixed boom is shaped to allow the rotor mast of the at least one rotor assembly to move through a range of angular degrees of rotation within the slot of the at least one fixed boom to position the at least one rotor assembly based on the control command to vector the thrust provided by the at least one rotor assembly.

14. The tiltrotor aircraft of claim 11, wherein the at least one rotor assembly includes:

at least two rear rotor assemblies each functionally coupled to a respective rear rotating pylon of a plurality of rear rotating pylons, wherein a first rear rotating pylon of the plurality of rear rotating pylons is disposed within a tail end of a right-side boom of the at least one boom and wherein a second rear rotating pylon of the plurality of rear rotating pylons is disposed within a tail end of a left-side boom of the at least one boom; and at least two forward rotor assemblies each functionally coupled to a respective forward rotating pylon of a plurality of forward rotating pylons, wherein a first forward rotating pylon of the plurality of forward rotating pylons is disposed within a forward end of the right-side boom of the at least one boom and wherein a second forward rotating pylon of the plurality of forward rotating pylons is disposed within a forward end of the left-side boom of the at least one boom.

15. The tiltrotor aircraft of claim 14, wherein the at least one rotating pylon assembly is configured to rotate the at least one rotor assembly to vector the thrust of the at least one rotor assembly to move the aircraft in a direction specified in a directional command, including:

rotating the at least two rear rotor assemblies and the at least two forward rotor assemblies in the left direction to vector the thrust of each of the at least two rear rotor assemblies and the at least two forward rotor assemblies to move the aircraft to the left in a side-to-side translational direction when the directional command specifies a left side-to-side translation motion;

rotating the at least two rear rotor assemblies and the at least two forward rotor assemblies in the right direction to vector the thrust of each of the at least two rear rotor assemblies and the at least two forward rotor assemblies to move the aircraft to the right in the side-to-side translational direction when the directional command specifies a right side-to-side translation motion;

rotating the at least two rear rotor assemblies in the right direction and the at least two forward rotor assemblies in the left direction to vector the thrust of each of the at least two rear rotor assemblies and the at least two forward rotor assemblies to yaw a forward end of the aircraft in the left direction when the directional command specifies a left yaw motion; and rotating the at least two rear rotor assemblies in the left direction and the at least two forward rotor assemblies in the right direction to vector the thrust of each of the at least two rear rotor assemblies and the at least two forward rotor assemblies to yaw the forward end of the aircraft in the right direction when the directional command specifies a right yaw motion.

\* \* \* \* \*